United States Patent
Barbieri et al.

(10) Patent No.: US 9,781,709 B2
(45) Date of Patent: *Oct. 3, 2017

(54) REPORTING OF CHANNEL PROPERTIES IN HETEROGENEOUS NETWORKS

(71) Applicant: QUALCOMM Incorporated, San Diego, CA (US)

(72) Inventors: Alan Barbieri, La Jolla, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/009,491

(22) Filed: Jan. 28, 2016

(65) Prior Publication Data

US 2016/0150528 A1  May 26, 2016

Related U.S. Application Data

(63) Continuation of application No. 13/245,467, filed on Sep. 26, 2011, now Pat. No. 9,307,431.

(Continued)

(51) Int. Cl.
*H04W 24/00* (2009.01)
*H04W 72/04* (2009.01)
(Continued)

(52) U.S. Cl.
CPC ....... *H04W 72/0413* (2013.01); *H04L 5/0023* (2013.01); *H04L 5/0053* (2013.01);
(Continued)

(58) Field of Classification Search
None
See application file for complete search history.

(56) References Cited

U.S. PATENT DOCUMENTS 5,936,979 A    8/1999   Jyrkkae
6,574,456 B2   6/2003   Hamabe
(Continued)

FOREIGN PATENT DOCUMENTS

CN    1438781 A    8/2003
CN    1708923 A    12/2005
(Continued)

OTHER PUBLICATIONS

"3rd Generation Partnership Project; Technical Specification Group Radio Access Network; Evolved Universal Terrestrial Radio Access (E-UTRA) ; Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010 (Sep. 17, 2010), pp. 1-80, XP050442094, [retrieved on Sep. 17, 2010].

(Continued)

*Primary Examiner* — Kouroush Mohebbi
(74) *Attorney, Agent, or Firm* — Norton Rose Fulbright LLP

(57) ABSTRACT

Rank indicator and channel quality indicator (CQI) estimation and reporting functionalities are discussed with regard to heterogeneous networks to reduce the number of inconsistent CQI estimates transmitted to an evolved node B (eNB), where the CQI is defined as inconsistent when the rank indicator, on which the CQI is conditioned, is from a different subframe type than the subframe on which the CQI is to be estimated.

20 Claims, 15 Drawing Sheets

Related U.S. Application Data

(60) Provisional application No. 61/386,875, filed on Sep. 27, 2010.

(51) Int. Cl.
    *H04L 5/00*              (2006.01)
    *H04W 24/10*           (2009.01)
    *H04W 72/06*           (2009.01)

(52) U.S. Cl.
    CPC ........... *H04L 5/0057* (2013.01); *H04W 24/10* (2013.01); *H04W 72/06* (2013.01)

(56) References Cited

U.S. PATENT DOCUMENTS

| | | |
|---|---|---|
| 6,839,333 B1 | 1/2005 | Åkerberg |
| 6,907,270 B1 | 6/2005 | Blanz |
| 6,973,098 B1 | 12/2005 | Lundby et al. |
| 7,031,753 B2 | 4/2006 | Hashem et al. |
| 7,184,497 B2 | 2/2007 | Jeske et al. |
| 7,283,510 B2 | 10/2007 | Ito et al. |
| 7,428,269 B2 | 9/2008 | Sampath et al. |
| 7,738,907 B2 | 6/2010 | Xiao et al. |
| 7,742,444 B2 | 6/2010 | Mese et al. |
| 7,813,311 B2 | 10/2010 | Dick et al. |
| 7,852,744 B2 | 12/2010 | Palanki |
| 7,860,198 B2 | 12/2010 | Montalbano |
| 7,907,572 B2 | 3/2011 | Yang et al. |
| 7,944,983 B2 | 5/2011 | Fu et al. |
| 8,068,785 B2 | 11/2011 | Ahn et al. |
| 8,073,481 B2 | 12/2011 | Luo et al. |
| 8,085,875 B2 | 12/2011 | Gore et al. |
| 8,102,935 B2 | 1/2012 | Akkarakaran et al. |
| 8,107,885 B2 | 1/2012 | Love et al. |
| 8,121,602 B2 | 2/2012 | Yi et al. |
| 8,130,849 B2 | 3/2012 | Lincoln et al. |
| 8,229,036 B2 | 7/2012 | Kolze |
| 8,254,911 B1 | 8/2012 | Lee |
| 8,270,547 B2 | 9/2012 | Panicker et al. |
| 8,275,408 B2 | 9/2012 | Attar et al. |
| 8,305,921 B2 | 11/2012 | Narasimhan et al. |
| 8,306,165 B2 | 11/2012 | Huang et al. |
| 8,385,477 B2 | 2/2013 | Cedergren et al. |
| 8,411,780 B2 | 4/2013 | Jonsson et al. |
| 8,477,603 B2 | 7/2013 | Sambhwani et al. |
| 8,493,942 B2 | 7/2013 | Luo et al. |
| 8,605,771 B2 | 12/2013 | Cairns |
| 8,611,295 B2 | 12/2013 | Song et al. |
| 8,654,701 B2 | 2/2014 | Kazmi et al. |
| 8,855,000 B2 | 10/2014 | Mallik et al. |
| 8,886,250 B2 | 11/2014 | Barbieri et al. |
| 9,307,431 B2 | 4/2016 | Barbieri et al. |
| 2001/0007819 A1 | 7/2001 | Kubota |
| 2002/0188723 A1 | 12/2002 | Choi et al. |
| 2003/0125040 A1 | 7/2003 | Walton et al. |
| 2004/0072579 A1 | 4/2004 | Hottinen |
| 2006/0121946 A1 | 6/2006 | Walton et al. |
| 2007/0036179 A1 | 2/2007 | Palanki et al. |
| 2007/0064655 A1 | 3/2007 | Ruuska |
| 2007/0081480 A1 | 4/2007 | Cai et al. |
| 2007/0098098 A1 | 5/2007 | Xiao et al. |
| 2007/0109989 A1 | 5/2007 | Nakagawa et al. |
| 2007/0191015 A1 | 8/2007 | Hwang et al. |
| 2007/0197251 A1 | 8/2007 | Das et al. |
| 2007/0232238 A1 | 10/2007 | Kawasaki |
| 2007/0293234 A1 | 12/2007 | Kim et al. |
| 2008/0014958 A1 | 1/2008 | Kim et al. |
| 2008/0051087 A1 | 2/2008 | Ryu et al. |
| 2008/0233967 A1 | 9/2008 | Montojo et al. |
| 2009/0135754 A1 | 5/2009 | Yavuz et al. |
| 2009/0170442 A1 | 7/2009 | Asanuma et al. |
| 2009/0199055 A1 | 8/2009 | Chen et al. |
| 2009/0201825 A1 | 8/2009 | Shen et al. |
| 2009/0238256 A1* | 9/2009 | Onggosanusi et al. ....... 375/228 |
| 2009/0247181 A1 | 10/2009 | Palanki et al. |
| 2009/0252077 A1 | 10/2009 | Khandekar et al. |
| 2009/0257390 A1 | 10/2009 | Ji et al. |
| 2009/0316809 A1 | 12/2009 | Chun et al. |
| 2009/0323616 A1 | 12/2009 | Zeller et al. |
| 2010/0002664 A1 | 1/2010 | Pan et al. |
| 2010/0008282 A1 | 1/2010 | Bhattad et al. |
| 2010/0035555 A1 | 2/2010 | Bala et al. |
| 2010/0039970 A1 | 2/2010 | Papasakellariou et al. |
| 2010/0041390 A1* | 2/2010 | Chen et al. ................... 455/423 |
| 2010/0048151 A1 | 2/2010 | Hara |
| 2010/0067366 A1 | 3/2010 | Nicoli et al. |
| 2010/0098012 A1* | 4/2010 | Bala et al. ................... 370/329 |
| 2010/0106828 A1 | 4/2010 | Palanki et al. |
| 2010/0111235 A1 | 5/2010 | Zeng et al. |
| 2010/0182903 A1 | 7/2010 | Palanki et al. |
| 2010/0195582 A1 | 8/2010 | Koskinen |
| 2010/0195604 A1 | 8/2010 | Papasakellariou et al. |
| 2010/0202311 A1 | 8/2010 | Lunttila et al. |
| 2010/0202372 A1* | 8/2010 | Chun et al. ................... 370/329 |
| 2010/0214937 A1* | 8/2010 | Chen et al. ................... 370/252 |
| 2010/0216405 A1 | 8/2010 | Bhadra et al. |
| 2010/0222062 A1 | 9/2010 | Chou et al. |
| 2010/0226327 A1 | 9/2010 | Zhang et al. |
| 2010/0227638 A1 | 9/2010 | Park et al. |
| 2010/0272077 A1 | 10/2010 | Van Rensburg et al. |
| 2010/0278109 A1 | 11/2010 | Papasakellariou et al. |
| 2011/0013710 A1 | 1/2011 | Xiao |
| 2011/0032839 A1* | 2/2011 | Chen et al. ................... 370/252 |
| 2011/0081917 A1 | 4/2011 | Frank et al. |
| 2011/0092231 A1 | 4/2011 | Yoo et al. |
| 2011/0105164 A1 | 5/2011 | Lim et al. |
| 2011/0105171 A1 | 5/2011 | Luschi et al. |
| 2011/0142003 A1 | 6/2011 | Kuchi et al. |
| 2011/0158211 A1 | 6/2011 | Gaal et al. |
| 2011/0170514 A1 | 7/2011 | Eriksson et al. |
| 2011/0177821 A1 | 7/2011 | Senarath et al. |
| 2011/0206167 A1 | 8/2011 | Rosenqvist et al. |
| 2011/0211503 A1 | 9/2011 | Che et al. |
| 2011/0249643 A1* | 10/2011 | Barbieri et al. ............... 370/329 |
| 2011/0250919 A1 | 10/2011 | Barbieri et al. |
| 2011/0275394 A1 | 11/2011 | Song et al. |
| 2011/0312319 A1* | 12/2011 | Lindoff et al. ................ 455/423 |
| 2011/0317624 A1 | 12/2011 | Luo et al. |
| 2012/0003945 A1 | 1/2012 | Liu et al. |
| 2012/0009959 A1 | 1/2012 | Yamada et al. |
| 2012/0044818 A1* | 2/2012 | Lindoff et al. ................ 370/252 |
| 2012/0063386 A1 | 3/2012 | Park et al. |
| 2012/0076040 A1 | 3/2012 | Hoshino et al. |
| 2012/0082197 A1 | 4/2012 | Jonsson et al. |
| 2012/0092989 A1 | 4/2012 | Baldemair et al. |
| 2012/0113851 A1 | 5/2012 | Schober et al. |
| 2012/0190391 A1 | 7/2012 | Yoo et al. |
| 2012/0201152 A1 | 8/2012 | Yoo et al. |
| 2012/0263247 A1 | 10/2012 | Bhattad et al. |
| 2012/0329498 A1 | 12/2012 | Koo et al. |
| 2013/0039203 A1 | 2/2013 | Fong et al. |
| 2013/0157675 A1 | 6/2013 | Li et al. |
| 2013/0301458 A1 | 11/2013 | Barbieri et al. |
| 2014/0348019 A1 | 11/2014 | Barbieri et al. |

FOREIGN PATENT DOCUMENTS

| | | |
|---|---|---|
| CN | 1943158 A | 4/2007 |
| CN | 101827387 A | 9/2010 |
| EP | 1337054 A2 | 8/2003 |
| EP | 1735938 A1 | 12/2006 |
| JP | 2007189619 A | 7/2007 |
| JP | 3973017 B2 | 9/2007 |
| JP | 2010016494 A | 1/2010 |
| KR | 20080046404 A | 5/2008 |
| RU | 2211535 C2 | 8/2003 |
| RU | 2351069 C2 | 3/2009 |
| WO | WO-03041300 A1 | 5/2003 |
| WO | WO-2005089004 A1 | 9/2005 |
| WO | WO-2005099163 A1 | 10/2005 |
| WO | WO-2006020021 A1 | 2/2006 |
| WO | WO-2006099546 A1 | 9/2006 |
| WO | WO-2007016553 A1 | 2/2007 |
| WO | WO-2008042946 A2 | 4/2008 |

(56) References Cited

FOREIGN PATENT DOCUMENTS

| WO | WO-2008082118 | A1 | 7/2008 |
|---|---|---|---|
| WO | WO-2008118810 | A1 | 10/2008 |
| WO | WO-2009023730 | | 2/2009 |
| WO | WO-2009057960 | A2 | 5/2009 |
| WO | WO-2009065075 | A1 | 5/2009 |
| WO | WO-2009099811 | A1 | 8/2009 |
| WO | WO-2009118707 | A1 | 10/2009 |
| WO | WO 2009118707 | A1 * | 10/2009 |
| WO | WO-2009119988 | A1 | 10/2009 |
| WO | WO-2009120465 | A2 | 10/2009 |
| WO | WO-2009120934 | A1 | 10/2009 |
| WO | WO-2010002230 | A2 | 1/2010 |
| WO | WO-2010025270 | A1 | 3/2010 |
| WO | WO-2010056763 | A2 | 5/2010 |
| WO | WO-2010058979 | A2 | 5/2010 |
| WO | WO-2010074444 | A2 | 7/2010 |
| WO | WO-2010083451 | A2 | 7/2010 |
| WO | WO-2010089408 | A1 | 8/2010 |
| WO | WO 2010089408 | A1 * | 8/2010 |
| WO | WO-2010103886 | A1 | 9/2010 |
| WO | WO-2011002389 | A1 | 1/2011 |
| WO | WO-2011130447 | A1 | 10/2011 |
| WO | WO-2011163265 | A1 | 12/2011 |
| WO | WO-2011163482 | A1 | 12/2011 |
| WO | WO-2012018894 | A1 | 2/2012 |

OTHER PUBLICATIONS

CATT: "Analysis of Time-Partitioning Solution for Control Channel", 3GPP TSG RAN WG1 meeting #61bis, R1-103494, Dresden, Germany, Jun. 28-Jul. 2, 2010, pp. 1-3.

CATT: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; 20100222, Feb. 16, 2010 (Feb. 16, 2010), XP050418504, [retrieved on Feb. 16, 2010].

CMCC: "Discussion on HeNB related interference scenarios and deployment configurations" , 3GPP Draft; R4-091232, 3rd Generation Partnership Project (3GPP), Mobile Competence Centre ; 650, Route Des Lucioles ; F-06921 Sophia-Antipolis Cedex ; France, no. Seoul, Korea; 20090330, Mar. 30, 2009 (Mar. 30, 2009), XP050342009, [retrieved on Mar. 30, 2009] the whole document.

Duplicy, J. et al. (Mar. 8, 2011) "MU-MIMO in LTE Systems," EURASIP Journal on Wireless Communications and Networking, Hindawi Publishing Corporation, vol. 2011, Article ID 496763, pp. 1-13, doi: 10.1155/2011/496763.

Hsieh M-H. et al: "Channel Estimation for OFDM Systems Based on Comb-Type Pilot Arrangement in Frequency Selective Fading Channels" IEEE Transactions on Consumer Electronics, vol. '44, No. 1, Feb. 1, 1998, pp. 217-225.

Huawei: "Correction on CQI reporting", 3GPP Draft; R1-091652 36.213 CR238(Rel-8,F) Correction on CQI Reporting, 3rd Generation Partnership Project (3GPP), Mobile Competence Centre ; 650, Route Des Lucioles ; F-06921 Sophia-Antipolis Cedex ; France, no. Seoul, Korea; 20090328, Mar. 28, 2009 (Mar. 28, 2009), XP050339187 , [retrieved on Mar. 28, 2009].

Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre ; 650, Route Des Lucioles ; F-06921 Sophia-Antipolis Cedex ; France, XP050418632, [retrieved on Feb. 16, 2010].

Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, no. Beijing, china; 20100412, Apr. 6, 2010 (Apr. 6, 2010), XP050419318, [retrieved on Apr. 6, 2010].

Huawei: "Enhanced ICIC and Resource-Specific CQI Measurement", 3GPP TSG RAN WG1 meeting #61bis, R1-103900, Dresden, Germany, Jun. 28-Jul. 2, 2010, pp. 1-6.

Intel Corporation (UK) Ltd, "Non-CA based PDCCH Interference Mitigation in LTE-A", 3GPP TSG RAN WG1 Meeting #61 R1-102814 Montreal, Canada, May 10-14, 2010.

International Search Report and Written Opinion—PCT/US2011/053424—ISA/EPO—Feb. 29, 2012.

Khandekar A., "LTE-Advanced: Heterogeneous networks", Wireless Conference (EW), 2010 European, Apr. 12-15, 2010, pp. 978-982.

LG Electronics, "Extending Rel-8/9 ICIC for heterogeneous network", 3GPP TSG RAN WG1 Meeting #60bis, R1-102430, Apr. 12-16, 2010, 4 pages.

Nishio A, et al., "Adaptive Transmission Techniques for Control Signaling in 3G-LTE," Panasonic Technical Journal, vol. 55, No. 1, Apr. 2009, pp. 15-20.

NTT Docomo: "Interference Coordination for Non-CA-based Heterogeneous Networks", 3GPP Draft; R1-102307 ICIC for NON-CA Hetnet, 3rd Generation Partnership Project (3GPP), Mobile Competence Centre; 650, Route Des Lucioles; F-06921 Sophia-Antipolis Cedex; France, vol. RAN WG1, no. Beijing, china; 20100412, Apr. 7, 2010 (Apr. 7, 2010), pp. 1-11, XP050419698, [retrieved on Apr. 7, 2010].

Partial International Search Report—PCT/US20111053424—International Search Authority, European Patent Office, Dec. 29, 2011.

Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, no. Warsaw, Poland; 20080625, Jun. 25, 2008 (Jun. 25, 2008), pp. 1-3, XP050110793, [retrieved on Jun. 25, 2008].

Qualcomm Incorporated: "Data channel ICIC and the benefits of possible extensions", 3GPP Draft; R1-103562 Data Channel ICIC and the Benefits of Possible Extensions, 3rd Generation Partnership Project (3GPP), Mobile Competence Centre; 650, Route Des Lucioles; F-06921 Sophia-Anti polis Cedex; France, vol. RAN WG1, no. Dresden, Germany; 20100628, Jun. 28-Jul. 2, 2010 (Jun. 22, 2010), XP050449060, pp. 1-5.

Qualcomm Incorporated, "Enabling communiction in harsh interference scenarios", 3GPP TSG-RAN WG1 #62bis R1-105693 Oct. 11-Oct. 15, 2010 Xian, China.

Research in Motion et al: "On Downlink Single Cell MU-MIMO in LTE-A", 3GPP Draft; R1-094458(Rim-Downlink Single Cell MU-MIMO in LTE-A), 3rd Generation Partnership Project (3GPP), Mobile Competence Centre ; 650, Route Des Lucioles ; F-06921 Sophia-Antipolis Cedex ; France, no. Jeju; 20091109, Nov. 9, 2009 (Nov. 9, 2009), XP050388884, [retrieved on Nov. 3, 2009] p. 3.

Research in Motion, UK Limited, "On Downlink Single Cell MU-MIMO in LTE-A", 3GPP TSG RAN WG1 Meeting #59bis R1-100562, Valencia, Spain, Jan. 18-22, 2010.

Samsung: Static/Dynamic Home eNB ICIC function, 3GPP TSG RAN WG1 #61 bis R1-103683, Jun. 24, 2010.

Sawahashi M., et al., "Coordinated multi point transmission/reception techniques for LTE-advanced [Coordinated and Distributed MIMO]" IEEE Wireless Communications, IEEE Service Center, Piscataway, NJ, US, vol. 17, No. 3, Jun. 1, 2010 (Jun. 1, 2010), pp. 26-34, XP011311805, ISSN: 1536-1284 p. 30, paragraph Uplink.

Huawei: "Enhanced ICIC and Resource-Specific CQI Measurement", 3GPP Draft, R1-103127 Enhanced ICIC and Resource Specific CQI Measurement_Final, 3rd Generation Partnership Project (3GPP), Mobile Competence Centre, 650, Route Des Lucioles, F-06921 Sophia-Antipolis Cedex, France, vol. RAN WG1, No. Montreal, Canada, 20100510, May 4 2010 (May 4, 2010), 4 pages, XP050420196, [retrieved on May 4 2010].

NEC Group: "CQI-RS for LTE-Advanced", 3GPP Draft, R1-091221-CQI-RS, 3rd Generation Partnership Project (3GPP), Mobile Competence Centre, 650, Route Des Lucioles, F-06921 Sophiaantipolis Cedex, France, No. Seoul, Korea, 20090319, Mar. 19 2009 (Mar. 19 2009), 6 pages, XP050338836, [retrieved on Mar. 3 2009].

(56) References Cited

OTHER PUBLICATIONS

Ntt Docomo : "Monitoring Multiple Layers using Measurement Gaps," R4-081500, 3GPP, Jun. 20 2008, 2 pages.

* cited by examiner

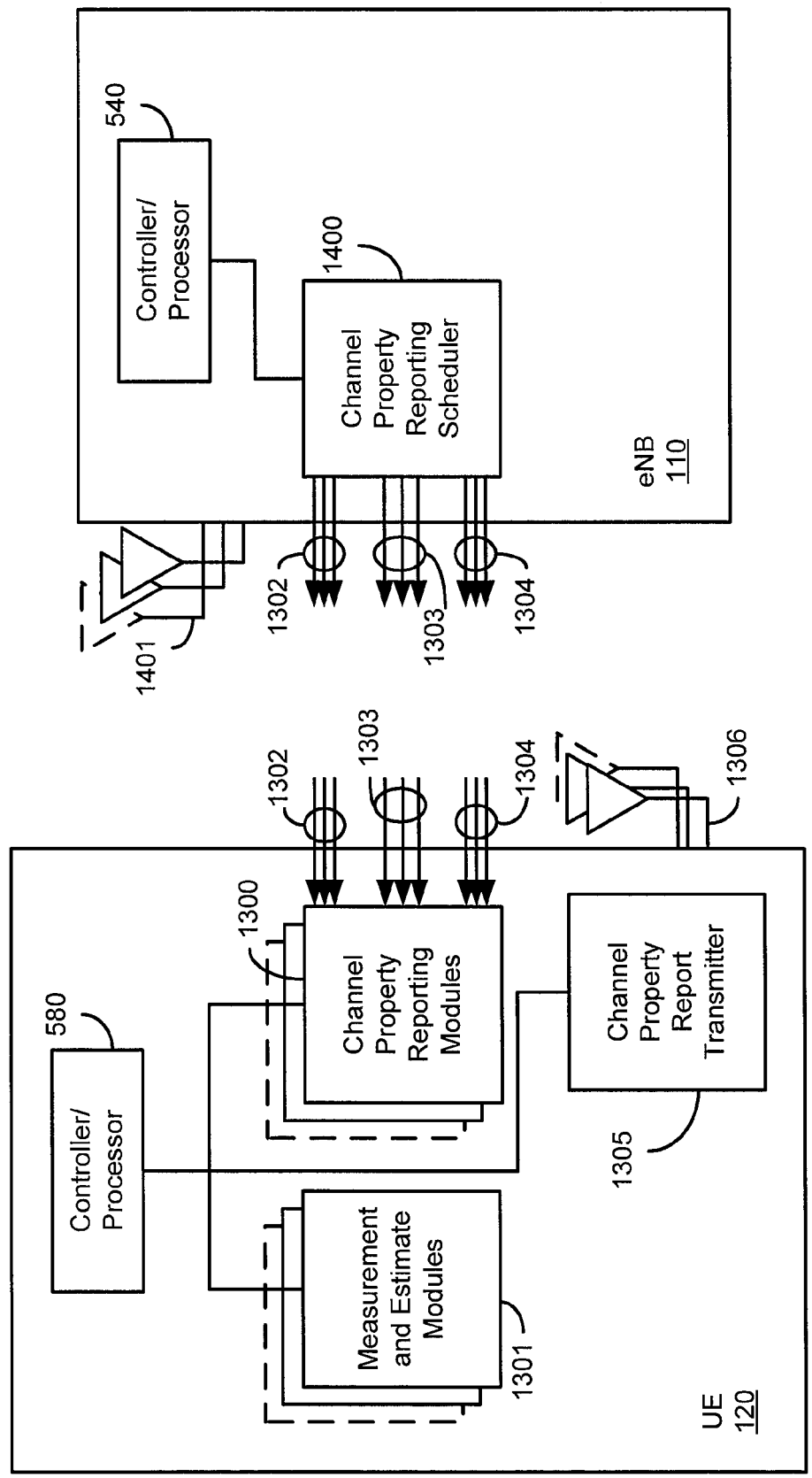

REPORTING OF CHANNEL PROPERTIES IN HETEROGENEOUS NETWORKS

CROSS-REFERENCE TO RELATED APPLICATIONS

This application is a continuation of co-pending, commonly assigned, patent application Ser. No. 13/245,467 entitled, "REPORTING OF CHANNEL PROPERTIES IN HETEROGENEOUS NETWORKS," filed Sep. 26, 2011, which claims benefit of U.S. Provisional Patent Application Ser. No. 61/386,875, filed Sep. 27, 2010, the disclosures of which are herein incorporated by reference in their entirety. This application further relates to the following commonly-owned, co-pending applications, the disclosures of which are expressly incorporated by reference herein in their entirety:

U.S. patent application Ser. No. 13/084,154, filed Apr. 11, 2011, entitled, "CQI ESTIMATION IN A WIRELESS COMMUNICATION NETWORK," which claims priority to U.S. Provisional Patent Application No. 61/323,822, filed Apr. 13, 2010;

U.S. patent application Ser. No. 13/084,959, filed Apr. 12, 2011, entitled, "CHANNEL STATE INFORMATION REPORTING IN A WIRELESS COMMUNICATION NETWORK," which claims priority to U.S. Provisional Patent Application No. 61/323,829, filed Apr. 13, 2010;

U.S. patent application Ser. No. 13/190,308, filed Jul. 25, 2011, entitled, "PHYSICAL LAYER SIGNALING TO USER EQUIPMENT IN A WIRELESS COMMUNICATION SYSTEM," which claims priority to U.S. Provisional Patent Application No. 61/367,865, filed Jul. 26, 2010; and U.S. patent application Ser. No. 13/163,595, filed Jun. 17, 2011, entitled, "CHANNEL QUALITY REPORTING FOR DIFFERENT TYPES OF SUBFRAMES," which claims priority to U.S. Provisional Patent Application No. 61/356,346, filed Jun. 18, 2010.

BACKGROUND

Field

Aspects of the present disclosure relate generally to wireless communication systems, and more particularly, to reporting of channel properties in a heterogeneous networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to rank indicator, PMI, and CQI estimation and reporting functionalities with regard to heterogeneous networks. The various aspects are directed to reduce the number of inconsistent CQI estimates transmitted to an eNB, where the CQI is defined as inconsistent when the rank indicator, on which the CQI is conditioned, is from a subframe of a different interference level than the subframe on which the CQI is to be estimated. In one such aspect, multiple periodic reporting engines are provided for in the UE for receiving scheduling parameters from an associated eNB. The eNB compiles the scheduling parameters specifically for each UE to schedule all of the UEs reporting engines to perform channel property (e.g., rank indicator, PMI, CQI, and the like) estimation and reporting as various periodicities and offsets. The eNB may compile parameters to schedule one reporting engine of the UE to estimate channel properties on certain subframes or subframe types, such as only on clean subframes or only unclean subframes. The network, through the eNB controls the scheduling of the multiple reporting engines on each UE to reduce the number of inconsistent channel property estimates.

In one aspect of the present disclosure, a method for wireless communication includes receiving parameter values at a UE for reporting multiple channel properties associated with a resource and estimating a first set of channel properties related to a first channel property, where the estimating uses a first set of the parameter values received. The method further includes estimating a second set of channel properties related to a second channel property, where the estimating uses a second set of the parameter values received, wherein the estimating of the first and second sets of the plurality of channel properties is performed in parallel. The method also includes transmitting the estimated channel properties to an associated eNB.

In an additional aspect of the disclosure, an apparatus configured for wireless communication including means for receiving parameter values at a UE for reporting channel properties associated with a resource and means for estimating a first set of channel properties related to a first channel property, where the means for estimating uses a first set of the parameter values received. The apparatus further includes means for estimating a second set of channel properties related to a second channel property, where the means for estimating the second set uses a second set of the parameter values received, wherein the means for estimating the first and second sets of channel properties is performed in parallel. The apparatus further includes means for transmitting the estimated channel properties to an associated eNB.

In an additional aspect of the disclosure, a computer program product for wireless communications in a wireless network, including a non-transitory computer-readable medium having program code recorded thereon. The program code includes code to receive parameter values at a UE for reporting channel properties associated with a resource and code to estimate a first set of channel properties related to a first channel property, where the code to estimate the first set uses a first set of the parameter values received. The program code also includes code to estimate a second set of channel properties related to a second channel property, where the code to estimate the second set uses a second set of the parameter values received, wherein the code to estimate the first and second sets of channel properties is performed in parallel. The program code also includes code to transmit the estimated channel properties to an associated eNB.

In an additional aspect of the disclosure, an apparatus configured for wireless communication includes at least one processor and a memory coupled to the processor. The processor is configured to receive parameter values at a UE for reporting channel properties associated with a resource and to estimate a first set of channel properties related to a first channel property, where the processor configured to estimate the first set uses a first set of the parameter values received. The processor is further configured to estimate a second set of channel properties related to a second channel property, where the processor configured to estimate the second set uses a second set of the parameter values received, wherein the estimation of the first and second sets of channel properties is performed by the processor in parallel. The processor is further configured to transmit the estimated channel properties to an associated eNB.

In an additional aspect of the disclosure, a method of wireless communication includes compiling sets of scheduling parameter values, wherein each set includes scheduling parameters designed to configure scheduling of a reporting engine of a UE for estimating channel properties of the UE, and wherein two or more of the plurality of sets are compiled for a specific UE. The method also includes transmitting the sets of scheduling parameters values to a corresponding UE.

In an additional aspect of the disclosure, an apparatus configured for wireless communication includes means for compiling sets of scheduling parameter values, wherein each set includes scheduling parameters designed to configure scheduling of a reporting engine of a UE for estimating channel properties of the UE and wherein two or more of the sets are compiled for a specific UE. The apparatus further includes means for transmitting the sets of scheduling parameters values to a corresponding UE.

In one aspect of the disclosure, a computer program product for wireless communications in a wireless network, includes a non-transitory computer-readable medium having program code recorded thereon. The program code includes code to compile sets of scheduling parameter values, wherein each set includes scheduling parameters designed to configure scheduling of a reporting engine of a UE for estimating channel properties of the UE, and wherein two or more of the sets are compiled for a specific UE. The program code also includes code to transmit the sets of scheduling parameters values to a corresponding o UE.

In an additional aspect of the disclosure, an apparatus configured for wireless communication includes at least one processor and a memory coupled to the processor. The processor is configured to compile sets of scheduling parameter values, wherein each set includes scheduling parameters designed to configure scheduling of a reporting engine of a UE for estimating channel properties of the UE and wherein two or more of the sets are compiled for a specific UE. The processor is further configured to transmit the sets of scheduling parameters values to a corresponding UE.

BRIEF DESCRIPTION OF THE DRAWINGS

FIG. 10 is a functional block diagram conceptually illustrating example blocks executed to implement one aspect of the present disclosure.

FIG. 13 is a block diagram conceptually illustrating a UE configured according to one aspect of the present disclosure.

FIG. 14 is a block diagram conceptually illustrating an eNB configured according to one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
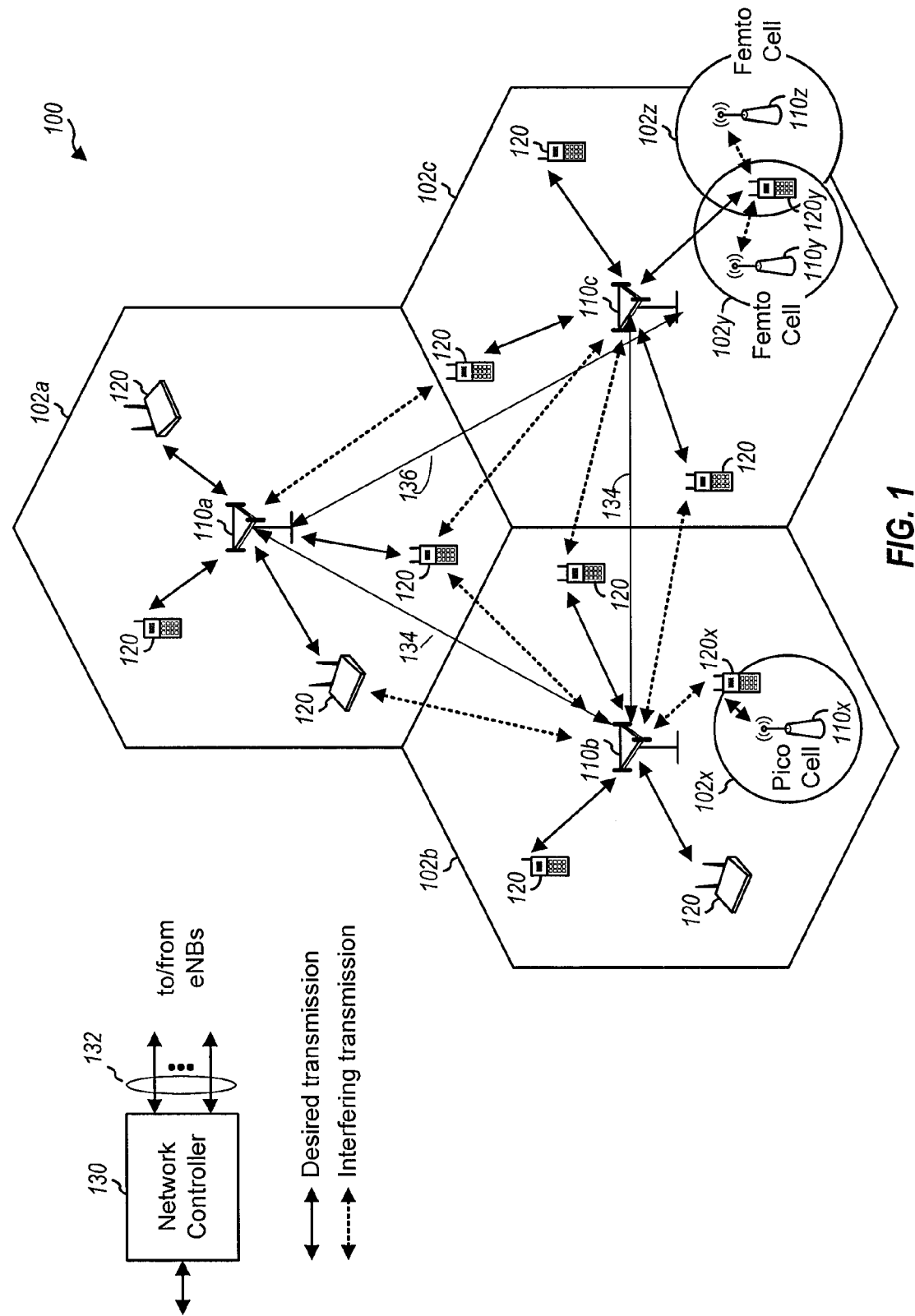
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
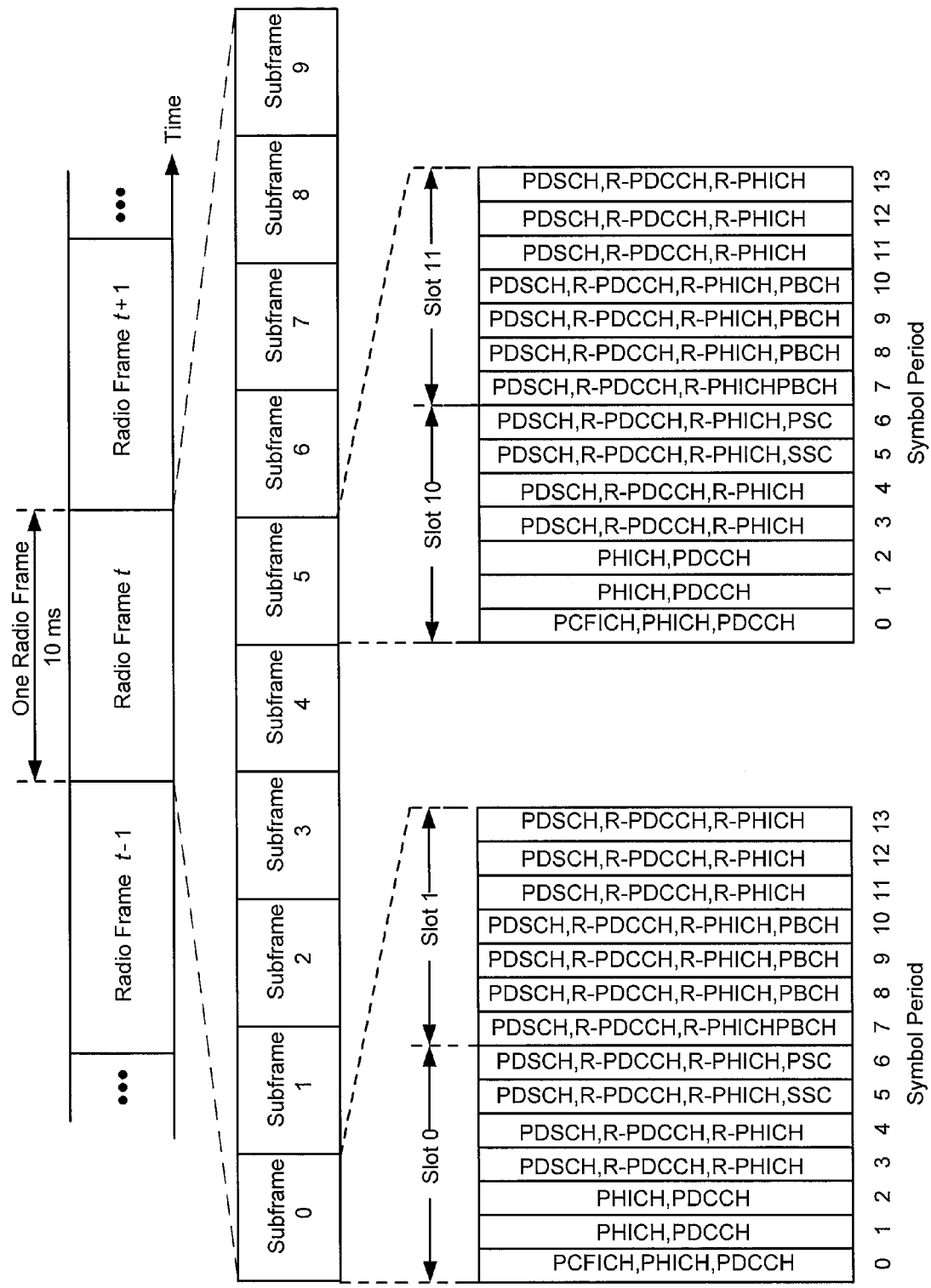
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
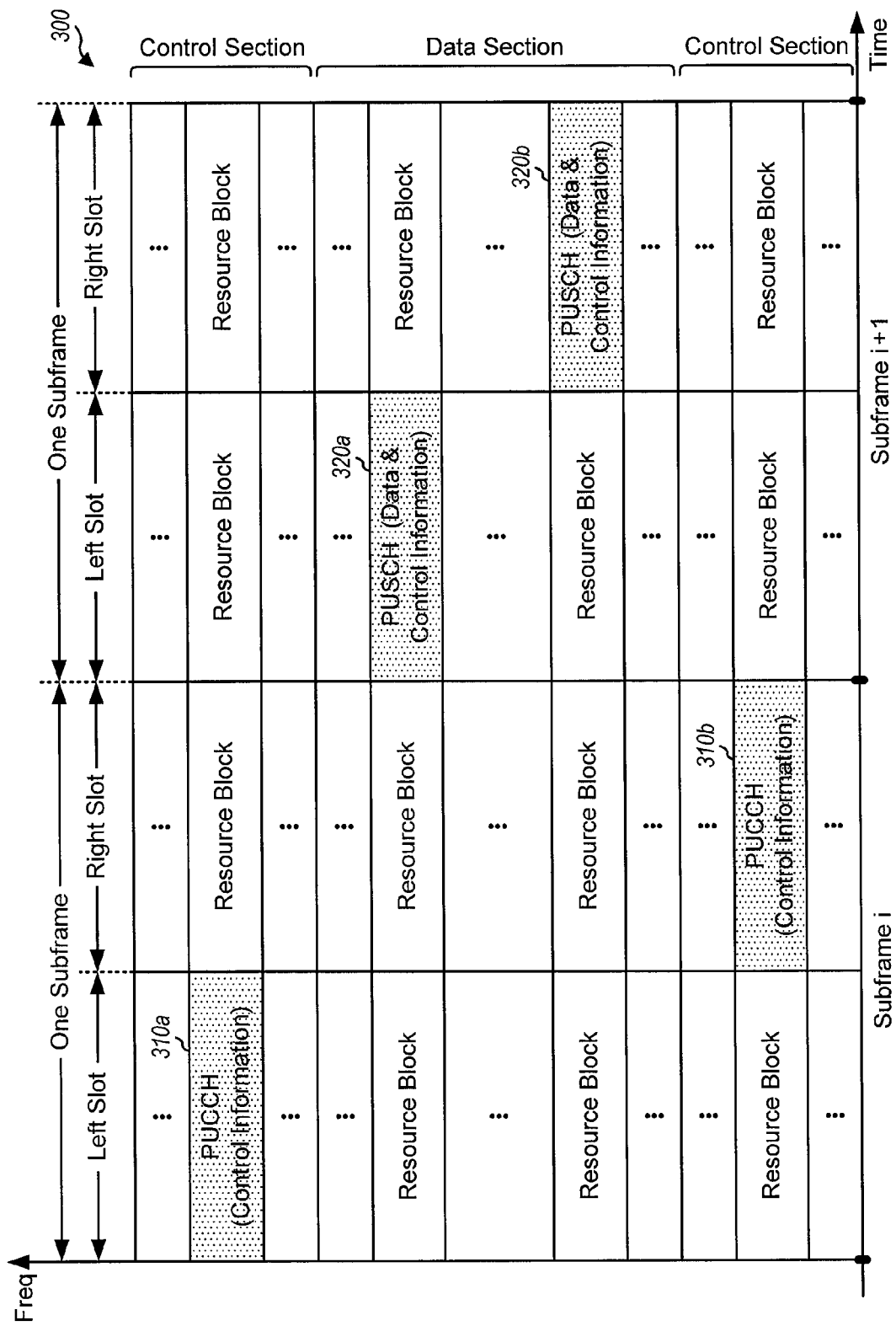
FIG. 3 is a block diagram conceptually illustrating an exemplary frame structure in uplink LTE/-A communications.

FIG. 3 is a block diagram conceptually illustrating an exemplary frame structure 300 in uplink long term evolution (LTE/-A) communications. The available resource blocks (RBs) for the uplink may be partitioned, into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

The PSS, SSS, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Referring back to FIG. 1, the wireless network 100 uses the diverse set of eNBs 110 (i.e., macro eNBs, pico eNBs, and femto eNBs) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x, which generally transmits at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, as provided in the LTE Release 8 standard, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
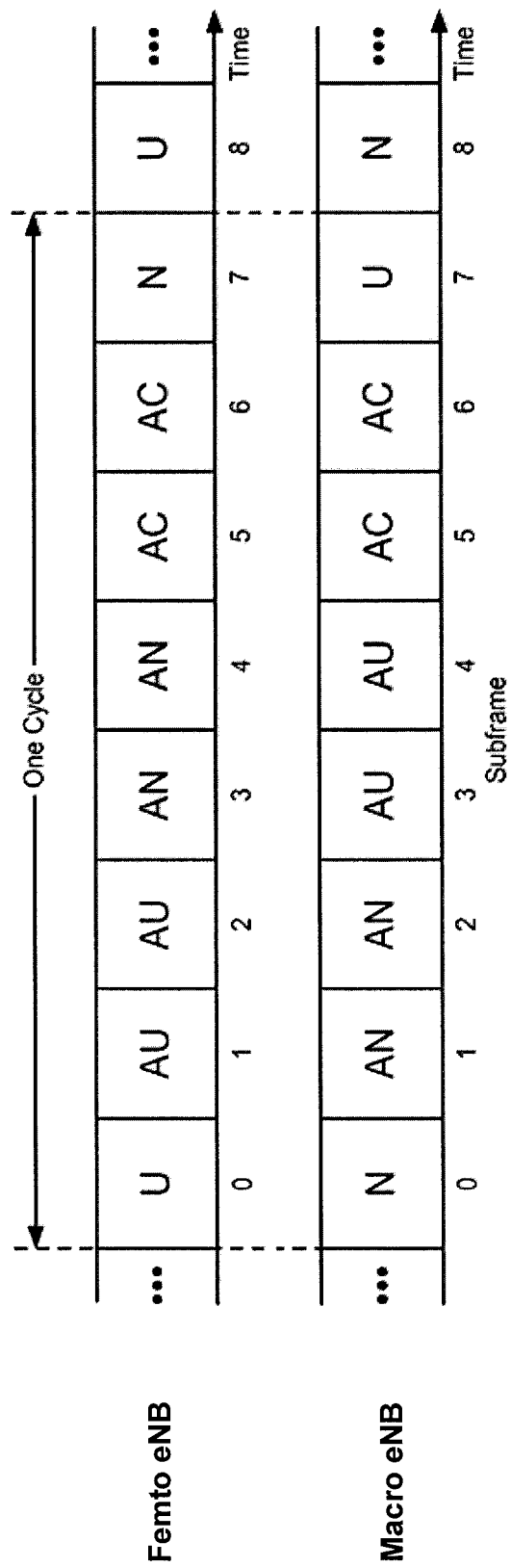
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
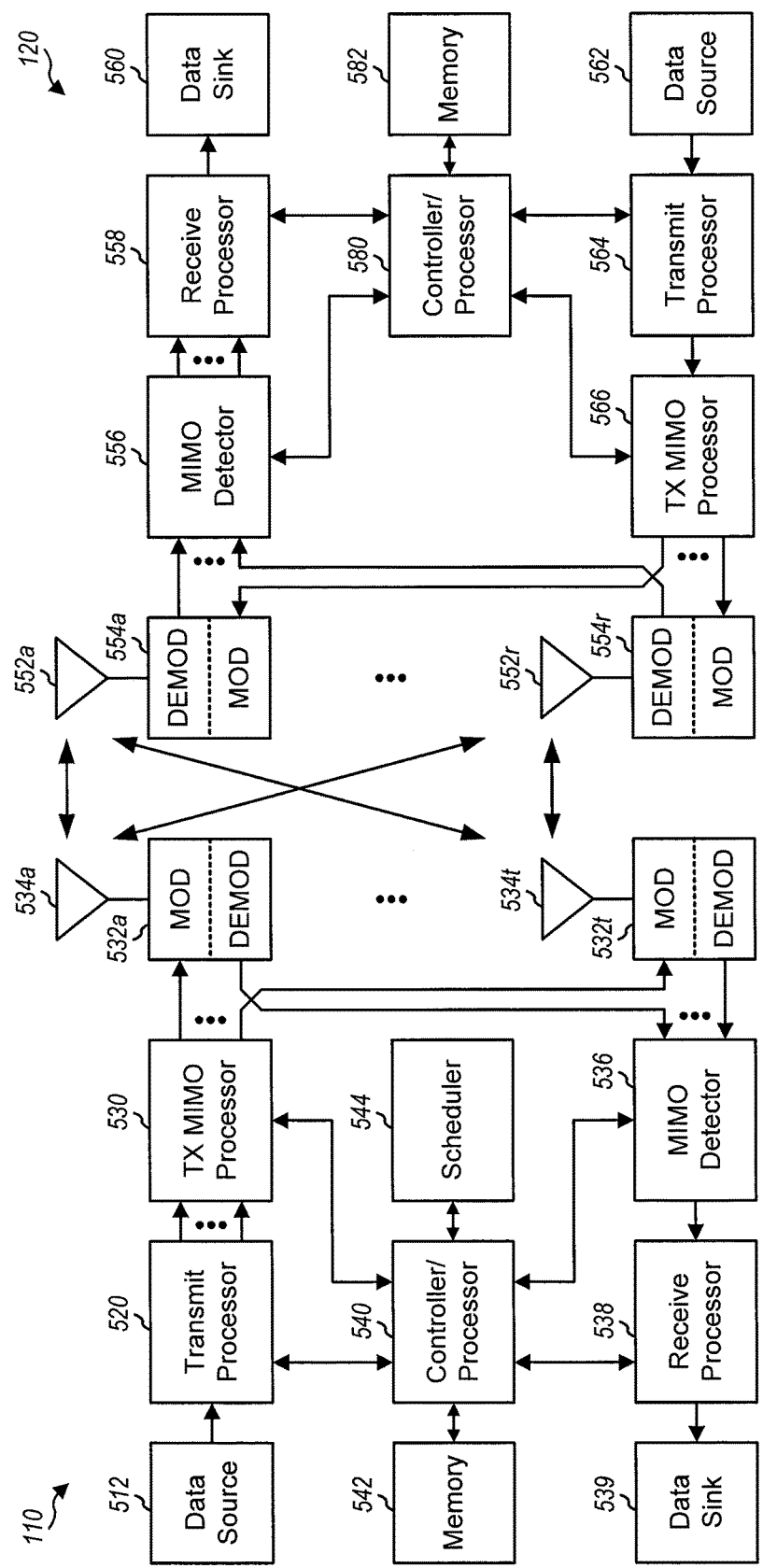
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The processor 520 may process (e.g., encode and symbol map) the data and control information to obtain data symbols and control symbols, respectively. The processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODS) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The processor 540 and/or other processors and modules at the eNB 110 may perform or direct the execution of various processes for the techniques described herein. The processor 580 and/or other processors and modules at the UE 120 may also perform or direct the execution of the functional blocks illustrated in FIGS. 8, 10-12, and 15-17, and/or other processes for the techniques described herein. The memories 542 and 582 may store data and program codes for the eNB 110 and the UE 120, respectively. A scheduler 544 may schedule UEs for data transmission on the downlink and/or uplink.

In heterogeneous networks with spatial multiplexing, eNBs may send multiple data streams or layers to UEs in downlink transmission using the same frequency. The number of such layers or streams is defined as the rank. For LTE Rel-8, UEs estimate the downlink channel and report the recommended rank indicator (RI) to the eNB for each subframe. A UE also reports the channel quality indicator (CQI) and the preceding matrix indicator (PMI) for the subframes. These indicators form a set of recommended channel properties for the eNB. Upon receiving this feedback (RI/PMI/CQI) from a UE, the eNB may then perform corresponding downlink scheduling.

Rank indicators, CQI and PMI are fed back from a UE to the eNB on the Physical Uplink Control Channel (PUCCH). The rank indicators, CQI and PMI are reported periodically but with different periodicity. The rank indicator feedback periodicity is often greater than the CQI periodicity. Additionally, there is an offset between the rank indicator reporting subframe and the CQI reporting subframe to ensure that the rank indicator reporting and CQI reporting occur in a different subframe. LTE Rel-8 provides that the rank indicator and CQI are not reported in the same subframe. The rank indicator reporting offset will often be defined relative to the CQI reporting offset to ensure this separate reporting. Exemplary values of the periodicity for rank indicators in LTE Rel-8 are (1 ms, 2 ms, 5 ms, 10 ms, 20 ms, 40 ms, OFF). The rank indicator reporting periodicity and offset may be transmitted by the eNB to a UE in a Radio Resource Control (RRC) message.

A CQI of different subframe types may be different. For example, the CQI of a protected subframe may be much higher than the CQI of a common subframe. In many downlink transmission modes, the CQI is conditioned on the rank indicator. When scheduling subframes, an eNB should know the correct CQI for each subframe considered for scheduling. For example, if an eNB is scheduling a common subframe, the eNB should not use the CQI for a protected subframe, because the CQI of the protected subframe is too optimistic. Although the following description is with respect to CQI, it is noted that any type of channel quality estimate is contemplated to be within the scope of the present disclosure.

eNBs broadcast Common Reference Signals (CRS) for use by UEs to acquire the eNB, perform downlink CQI measurements, and perform downlink channel estimation. CRS signals of any particular eNB are transmitted on all types of subframes, even subframes that would be restricted for that eNB from transmitting data on. Newer UEs may have a CRS-Interference Cancellation (RS-IC) capability allowing a newer UE to identify overlapping CRSs. However, to enable legacy UEs and UEs without RS-IC capabilities to function in a cell, eNBs may be designed to prevent overlapping CRS. For example, when multiple different power class eNBs are present in a cell, the CRS is offset such that the CRS of different eNBs does not collide. In LTE, there are typically either 6 or 3 available CRS offsets, depending on the number of eNB transmitter antennas (1 and 2, respectively) and generally only three different power classes.

When a UE performs CQI measurements during clean subframes, the CQI measurement will be high because aggressor eNBs are silent. However, a CQI measurement performed by the UE on an unclean subframe may be lower than that of a clean subframe. For example, if the aggressor eNB is transmitting during the unclean subframe, the CQI of the common subframe may be low, but if the aggressor eNB is not transmitting during the unclean subframe, the CQI may be as high as the clean one. The CQI may be correlated to the downlink buffer of the aggressor eNB. For example, if the downlink buffer of the aggressor eNB is full, the CQI may be low, but if the downlink buffer of the aggressor eNB is empty, the CQI may be high.

Subframe assignments are correlated to interference patterns in cells because the subframe assignments are used to coordinate interference between eNBs in a cell. Subframe assignments, and thus, interference patterns, in cells repeat periodically. For example, in some cells the interference pattern repeats every eight milliseconds. Although a CQI reporting periodicity can be as low as two milliseconds, according to the standards, eight milliseconds is the minimum CQI reporting periodicity that is a multiple of eight milliseconds. Thus, at all the integer multiples of the reporting periodicity the UE performs a CQI measurement and transmits a CQI report to the eNB serving the UE.

A 40 millisecond periodicity of CQI reports is insufficient to provide the eNB with up-to-date information in some situations such as, for example, when subframes are dynamically assigned or UEs are moving at high speeds. Additionally, providing a reporting periodicity that is a multiple of the periodicity of assignments in a cell would result in only a single subframe type (clean or unclean) being measured and reported through CQI measurements to the eNB. Whether a clean or unclean subframe is measured by the UE's CQI measurement in this case depends on the subframe offset indicated to the UE through an RRC message.

The CQI, therefore, is an important indicator for providing the eNB with the information to perform downlink scheduling. In certain situations, a CQI may not provide accurate information regarding the type of subframe. Much like the CQI measurement, the rank indicator of different subframe types may be different. For example, the rank indicator of a protected subframe may be higher than the rank indicator of a common subframe. In many downlink transmission modes, the CQI is conditioned on the latest reported rank indicator. Depending on the relative periodicity and offset, there may be occasion where the rank indicator evaluated on a clean subframe may be used as the basis of the next reported CQI referring to an unclean subframe. In this situation, the CQI may be inconsistent leading to potentially inefficient downlink scheduling.

It would be beneficial to ensure that the CQI is estimated on the same subframe type used for the latest rank indicator estimation, which, under current standards, may not always be possible. The rank indicator and CQI could also be assigned the same reporting periodicity, which may ensure this consistency. However, as noted, the current standard prohibits the rank indicator and CQI from reporting in the same subframe.

For purposes of selected aspects of the present disclosure, the particular subframe pattern is assumed to repeat periodically. Moreover, regardless of whether CRS collides with data or with the CRS of the dominant interferer, the UE, of such selected aspects, is assumed to be capable of figuring out whether the interferer is allowed to transmit on that subframe or not, so as to perform CRS-IC if necessary.

In one aspect of the present disclosure, both the CQI and the rank indicator may be assigned a 2 ms reporting periodicity but different offsets. For example, the UE reports the rank indicator on even subframes and the CQI may be reported on odd subframes. This configuration may decrease inconsistent reporting if clean and unclean subframes lie in both odd and even subframes at least once per interlace period. However, even with this particular aspect, inconsistencies may still arise. In order to reduce such inconsistencies in the presently described aspect, it may be useful to reduce the number of transitions between clean and unclean or unclean and clean in the subframe on which the rank indicator is evaluated and the immediately following subframe. In such an aspect, it may be desirable to have the same assignment for subframe n and subframe n+1 (where n is even) as often as possible.

Figure 6:
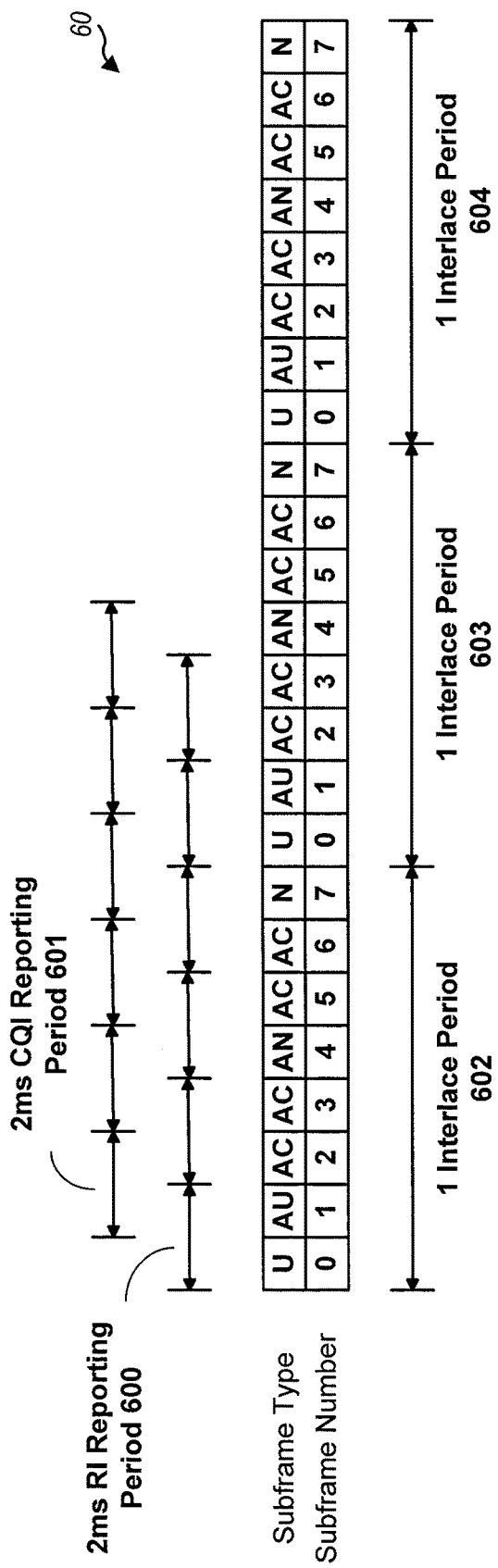
FIG. 6 is a block diagram illustrating data stream transmitted between an eNB and a UE in a wireless network configured according to one aspect of the present disclosure.

FIG. 6 is a block diagram illustrating data stream 60 transmitted between an eNB and a UE in a wireless network configured according to one aspect of the present disclosure. The data stream 60 is divided into periodic interlaces, the interlace periods 602-604. Within each of the interlace periods 602-604, subframes 0-7 are assigned to a particular subframe type. For example, subframe 0 is assigned to a static protected/clean type (U) for the serving cell, subframe 1 is assigned to a dynamically assigned protected/clean type (AU) for the serving cell, subframe 3 is assigned to a dynamically assigned common/unclean type (AC) for the serving cell, subframe 7 is assigned to a static prohibited/unclean type for the serving cell (N) for the serving cell, and so on. In the described aspect, the eNB assigns a 2 ms rank indicator reporting period 600 and a 2 ms CQI reporting period 601 to the UE. The CQI reporting period 601 is also offset differently than the rank indicator reporting period 600 such that the rank indicator will be reported on a different subframe than the CQI estimate.

In general, the reporting of either the rank indicator or CQI occurs 4 ms after the estimation occurs. Thus, if the rank indicator were estimated in subframe 0, the estimated rank indicator would be reported at subframe 4. There may be exceptions to the general rule of 4 ms (e.g., time division duplex (TDD) pattern, multicast-broadcast single-frequency network (MBSFN) subframes, measurement gaps, and the like). In such special cases, reporting would be delayed by 4 ms or more. The aspect of the present disclosure provides for clean and unclean subframes to lie on both odd and even subframes at least once per interlace period. For example, in interlace period 602, clean subframes are located at least in subframe 0 and 1 and unclean subframes are located at least in subframes 2 and 3.

It should be noted that negotiating the transitions between clean and unclean or unclean and clean may be structured such that the subframe immediately after the subframe used to estimate the rank indicator is assigned the same type as the subframe used for the estimation. For example, in subframe 4, the UE is scheduled to report the rank indicator. Because of the 4 ms offset between estimation and reporting, the rank indicator reported in subframe 4 was estimated in subframe 0. The next CQI scheduled for reporting after subframe 4 is for subframe 5. Thus, the subframe that would be used for the estimate is subframe 1. Subframe 1 is a clean subframe (AU). Also, the rank indicator on which the CQI estimate of subframe 1 is conditioned, is also a clean subframe. Therefore, by managing the transition between subframe 0 and subframe 1, the CQI estimation in subframe 1, which is reported in subframe 5, is consistent.

In another aspect of the present disclosure, both the CQI and the rank indicator are assigned a 5 ms reporting periodicity and different offsets. Because 5 ms and the interlace period duration have different prime values, both the CQI estimate and rank indicator evaluation will be performed on all interlace subframe types. With the 5 ms periodicity, latency may become an issue, especially when there is only one clean subframe or only one unclean subframe in each period. However, with a periodicity of 5 ms, the latency will usually be no more than 40 ms.

It should be noted that, even with this particular aspect of the present disclosure, inconsistencies may still occur. Accordingly, the offset between the CQI and the rank indicator may be selected in order to reduce the number of such inconsistent CQIs.

Figure 7:
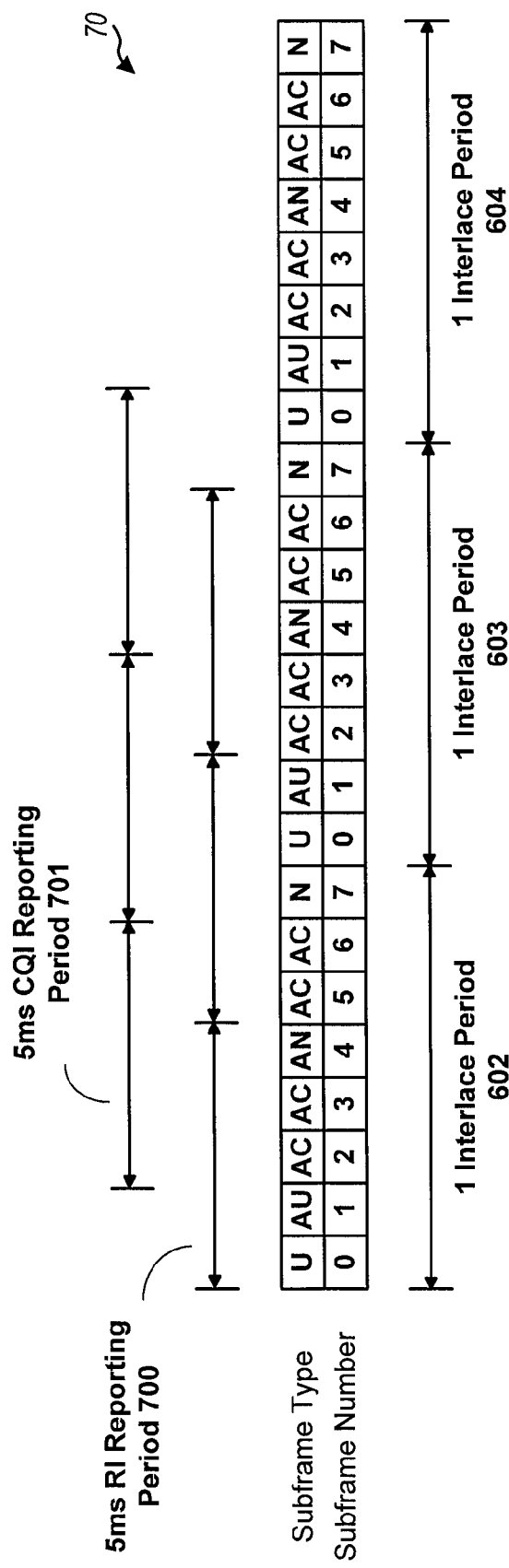
FIG. 7 is a block diagram illustrating data stream transmitted between an eNB and a UE in a wireless network configured according to one aspect of the present disclosure.

FIG. 7 is a block diagram illustrating data stream 70 transmitted between an eNB and a UE in a wireless network configured according to one aspect of the present disclosure. The data stream 70 is divided into periodic interlaces, the interlace periods 602-604. Within each of the interlace periods 602-604, subframes 0-7 are assigned to a particular subframe type. For example, subframe 0 is assigned to a static protected/clean type (U) for the serving cell, subframe 1 is assigned to a dynamically assigned protected/clean type (AU) for the serving cell, subframe 3 is assigned to a dynamically assigned common/unclean type (AC) for the serving cell, subframe 7 is assigned to a static prohibited/unclean type for the serving cell (N) for the serving cell, and so on. In the described aspect, the eNB assigns a 5 ms rank indicator reporting period 700 and a 5 ms CQI reporting period 701 to the UE. The CQI reporting period 701 is also offset differently than the rank indicator reporting period 700 such that the rank indicator will be reported on a different subframe than the CQI estimate. By assigning the periodicity to 5 ms, the eNB ensures that all of the subframes in the pattern will be estimated in the data stream 70. Thus, the make up of the pattern or the timing of the transitions between clean and unclean or unclean and clean will not necessarily be determinative of whether the described aspect operates as intended.

In another aspect of the present disclosure, both the CQI and the rank indicator are assigned the same periodicity assumed to be larger than 8 ms without being a multiple of 8 ms. A periodicity that is a multiple of 8 ms will result in only one subframe type being reported. With the larger periodicity assigned, the offsets are designed such that when the rank indicator is estimated in a particular subframe, subframe n, the next CQI is estimated in subframe n+8 (e.g., the offset may be 8 subframes). Thus, by definition, both the rank indicator report and the next CQI report will refer to the same subframe type (assuming no change in the subframe assignments).

It should be noted that with higher periodicity for CQI reporting and the reported CQIs alternating between clean and unclean subframes may result in higher latency in certain situations. However, this latency may not be detrimental in lower mobility scenarios.

Figure 8:
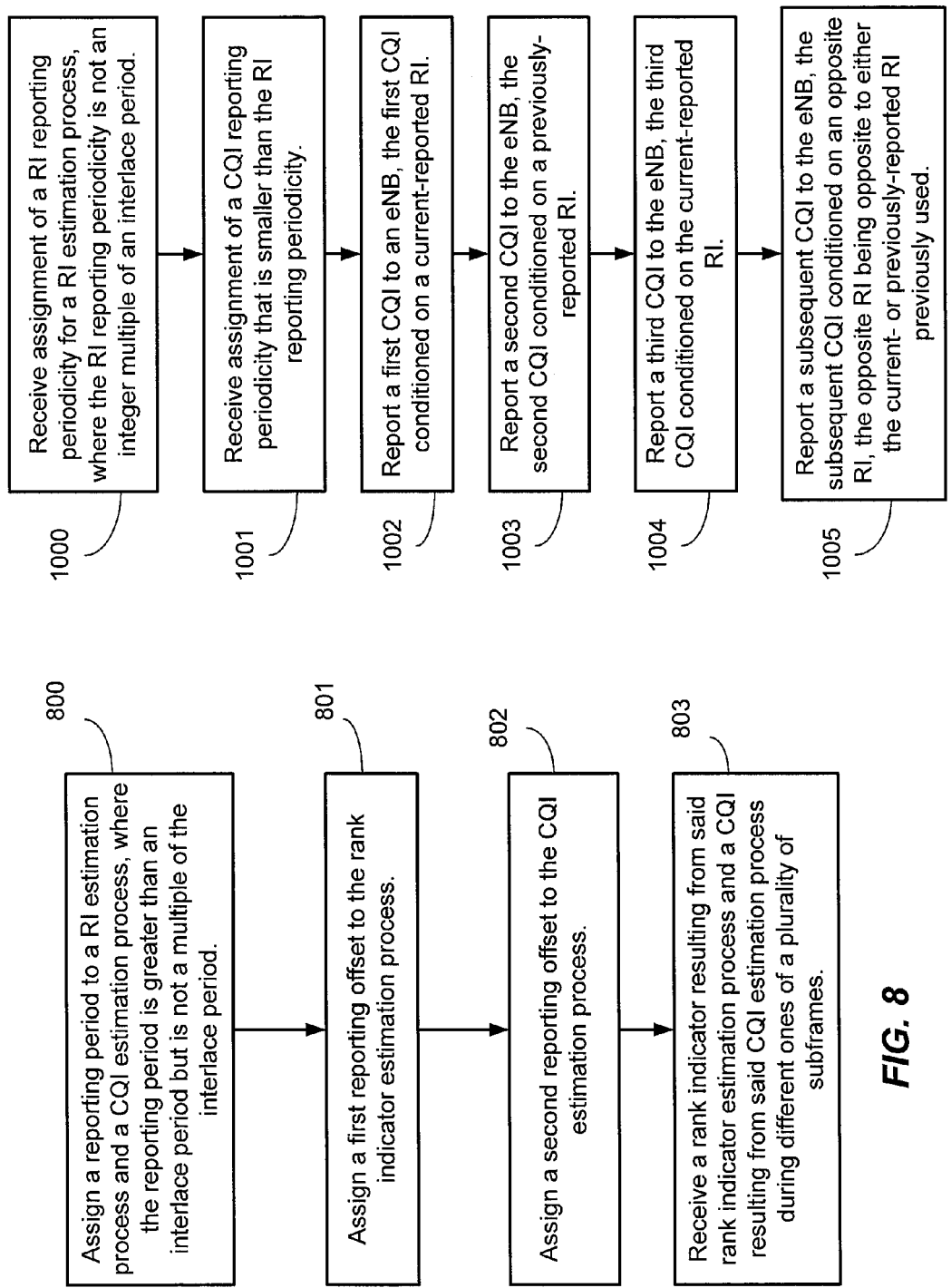
FIG. 8 is a functional block diagram conceptually illustrating example blocks executed to implement one aspect of the present disclosure.

FIG. 8 is a functional block diagram illustrating example blocks executed to implement one aspect of the present disclosure. In block 800, a reporting period is assigned to a rank indicator estimation process and a CQI estimation process, where the reporting period is greater than an interlace period but is not a multiple of the interlace period. A first reporting offset is assigned to the rank indicator estimation process in block 801. A second reporting offset is assigned to the CQI estimation process, in block 802, where the first and second reporting offsets are selected so that when a rate indicator is estimated in a first reference subframe, a next CQI is estimated in a next subframe equal to the first reference subframe plus the interlace period. In block 803, a rank indicator resulting from the rank indicator estimation process and a CQI resulting from the CQI estimation process are received during different subframes.

In another aspect of the present disclosure, a new, additional offset is defined. In the current LTE Rel-8, the offset between the subframe used for estimation (e.g., for estimating a rank indicator or CQI) and the subframe used for feedback or reporting the estimation is strictly defined. This is because the rank indicator and the CQI estimate cannot be reported together, as a collision would puncture the CQI. Thus, under the current Rel-8 standards, rank indicators and CQI also are not measured together in the same subframe. The present aspect adds a new offset that is defined to further delay CQI reporting with regard to the subframe used for the estimation.

The typical reporting instances for wideband CQI/PMI are defined as the subframes satisfying:

$$(10 \times n_f + \lfloor n_s/2 \rfloor - N_{OFFSET,CQI}) \bmod N_P = 0 \qquad (1)$$

where, $n_f$ is the system frame number, $n_s$ is the slot number, $N_{OFFSET,CQI}$ is the CQI offset, and $N_p$ is the CQI periodicity. In the time domain, the CQI reference resource is defined by a single downlink subframe, subframe n-$n_{CQI\_ref}$, where, for periodic CQI reporting, $n_{CQI\_ref}$ is defined as the smallest value greater than or equal to 4, such that it corresponds to a valid downlink subframe. The new offset, $n_{CQI\_est\_offset}$, may then be added to the CQI reference resource to define the downlink subframe, subframe n-$n_{CQI\_ref}$, $n_{CQI\_est\_offset}$. This new offset may then be designed so that the same subframe is used for both the rank indicator and the CQI estimation. Therefore, the rank indicator and the CQI may be estimated in the same subframe, but, because the new offset the corresponding reports will not occur in the same subframe.

It should be noted that in the presently described aspect of the disclosure, the rank indicator and CQI should have the same reporting periodicity.

Figure 9:
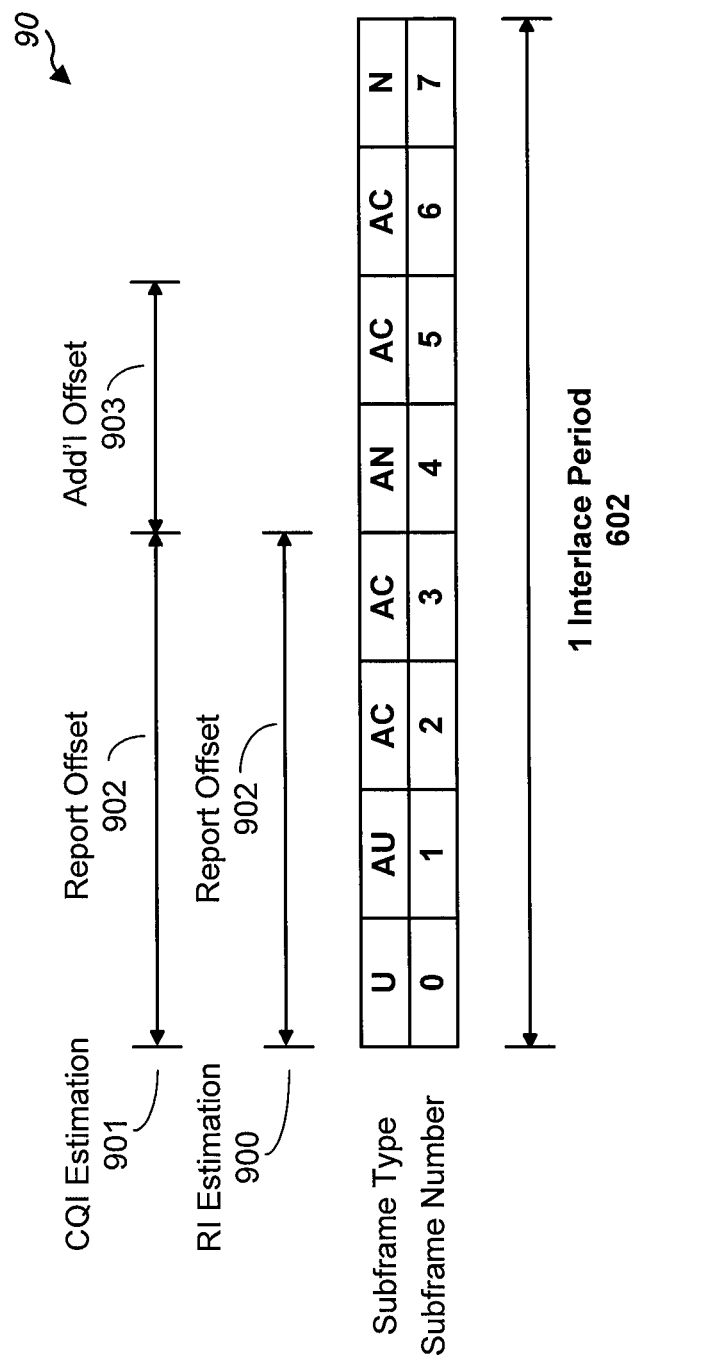
FIG. 9 is a block diagram conceptually illustrating an interlace period of a data stream communicated between an eNB and a UE in a wireless network configured according to one embodiment of the present aspect.

FIG. 9 is a block diagram illustrating an interlace period 602 of a data stream 90 communicated between an eNB and a UE in a wireless network configured according to one aspect of the present disclosure. Under the current standards, if the rank indicator and CQI were estimated in the same subframe, the offset between estimation and reporting would result in both the rank indicator and CQI being reported to the eNB during the same subframe. This collision of rank indicator and CQI would lead to the CQI being punctured and rendered useless to the eNB. However, in the example aspect described with respect to FIG. 9, the rank indicator estimation 900 and CQI estimation 901 are performed on the same subframe, subframe 0. Using the report offset 902, the rank indicator estimated in subframe is reported to the eNB during subframe 4 (assuming this is not a special case, such as a specific TDD pattern, an MBSFN subframe, measurement gaps, or the like). The report offset 902 is also applied to the CQI estimated in subframe 0. The UE will not report the estimated CQI in subframe 4 because of the additional offset 903 added in an information element from the eNB. The additional offset 903 triggers the UE to report the subframe 0-estimated CQI in subframe 6. Therefore, with the additional offset 903, the UE may estimate both the rank indicator and CQI in the same subframe, which results in no inconsistent CQIs reported to the eNB.

In another aspect of the present disclosure, the eNB sets the RI periodicity such that it is not an integer multiple of 8 ms. Thus, the rank indicator will progress through both clean and unclean interlaces. The CQI reporting periodicity is assigned to be smaller than the rank indicator reporting periodicity. In this presently described aspect, the first CQI estimation reported after the latest rank indicator is conditioned on that latest rank indicator. The second CQI estimation reported after the latest rank indicator is, instead, conditioned on the previously reported rank indicator. The next CQI estimation reported after the latest rank indicator is conditioned on the latest rank indicator again. The CQI estimation continues to alternate between being conditioned on the latest rank indicator and then the previous rank indicator. The eNB knows all of the subframe assignments and all of the periodicities. Therefore, the eNB will know if a reported CQI refers to a clean or unclean subframe and will also know if it is inconsistent. The eNB may determine to either discard the inconsistent reported CQIs or process it in order to project the correct rank indicator.

FIG. 10 is a functional block diagram illustrating example blocks executed to implement one aspect of the present disclosure. In block 1000, an assignment of a RI reporting periodicity is received for a RI estimation process, where the RI reporting periodicity is not an integer multiple of an interlace period. An assignment of a CQI reporting periodicity is received, in block 1001, that is smaller than the RI reporting periodicity. A first CQI is reported to an eNB, in block 1002, the first CQI conditioned on a current-reported RI. A second CQI is reported to the eNB, in block 1003, the second CQI conditioned on a previously-reported RI. A third CQI is reported to the eNB, in block 1004, the third CQI conditioned on the current-reported RI. In block 1005, a subsequent CQI is reported to the eNB, the subsequent CQI conditioned on an opposite RI, the opposite RI being opposite to either the current- or previously-reported RI previously used.

Another aspect of the present disclosure applies to the scenario where the rank indicator and CQI may have different reporting periods, and the rank indicator reports may alternate between clean and unclean subframes. In this aspect, the CQI reports (which may be timed for reporting more frequently than the rank indicator reports) are conditioned to the correct rank indicator whether or not the correct rank indicator is the latest reported rank indicator.

In this aspect, UEs that are compatible with the features in heterogeneous networks (HetNet-Capable UEs) are utilized. These HetNet-Capable UEs are configured to receive the semi-static resource partitioning information (SRPI), which identifies the static subframe assignments. When the last rank indicator reported was based on a first reference subframe type, the HetNet-Capable UE uses the SRPI information to identify the subframe of the second reference subframe type that is located before the subframe which should be used for estimation according to the LTE Rel-8 specifications. This closest subframe of the second reference subframe type will then be used for the next rank indicator estimation and reported according to the Rel-8 specifications. With each subsequent rank indicator estimation, the HetNet-Capable UE will determine the subframe of the alternating subframe type using the SRPI information in order to ensure that the rank indicator estimations alternate.

The CQI reports will also alternate between clean and unclean estimated subframes. For example, assuming that the last CQI report was for an unclean subframe. The HetNet-Capable UE will use the SRPI information to locate the closest clean subframe to the subframe that should have been used, as defined by the LTE Rel-8 standards, for the next CQI estimation. This closest clean subframe is then used for the CQI estimation, while the reporting is carried out on the same subframe indicated through the Rel-8 standards. Thus, the CQI estimation will be based on the correct ranking indicator based on the subframe type knowledge from the SRPI information.

It should be noted that when the assigned CQI reporting periodicity is small enough, it is likely that two consecutive CQI reports of the same type will be estimated based on the same subframe. Thus, the second CQI estimate will be the same as the first in this particular instance. However, the second CQI estimate is still reported according to the implemented reporting standards. The HetNet-Capable UE is able to determine when such subsequent CQI estimates will be the same and will simply resend the previously estimated CQI for the subsequent reporting period.

It should further be noted that in additional or alternative aspects, the HetNet-Capable UEs are configured to blindly decode the adaptively assigned subframes in addition to using the SRPI for the statically assigned subframes. With the use of the blind decoding for the adaptively assigned subframes, the HetNet-Capable UEs may potentially know the type of all 8 of the subframes in a period. As such, the HetNet-Capable UEs may use this improved information when determining which subframe to estimate for the CQI.

Figure 11:
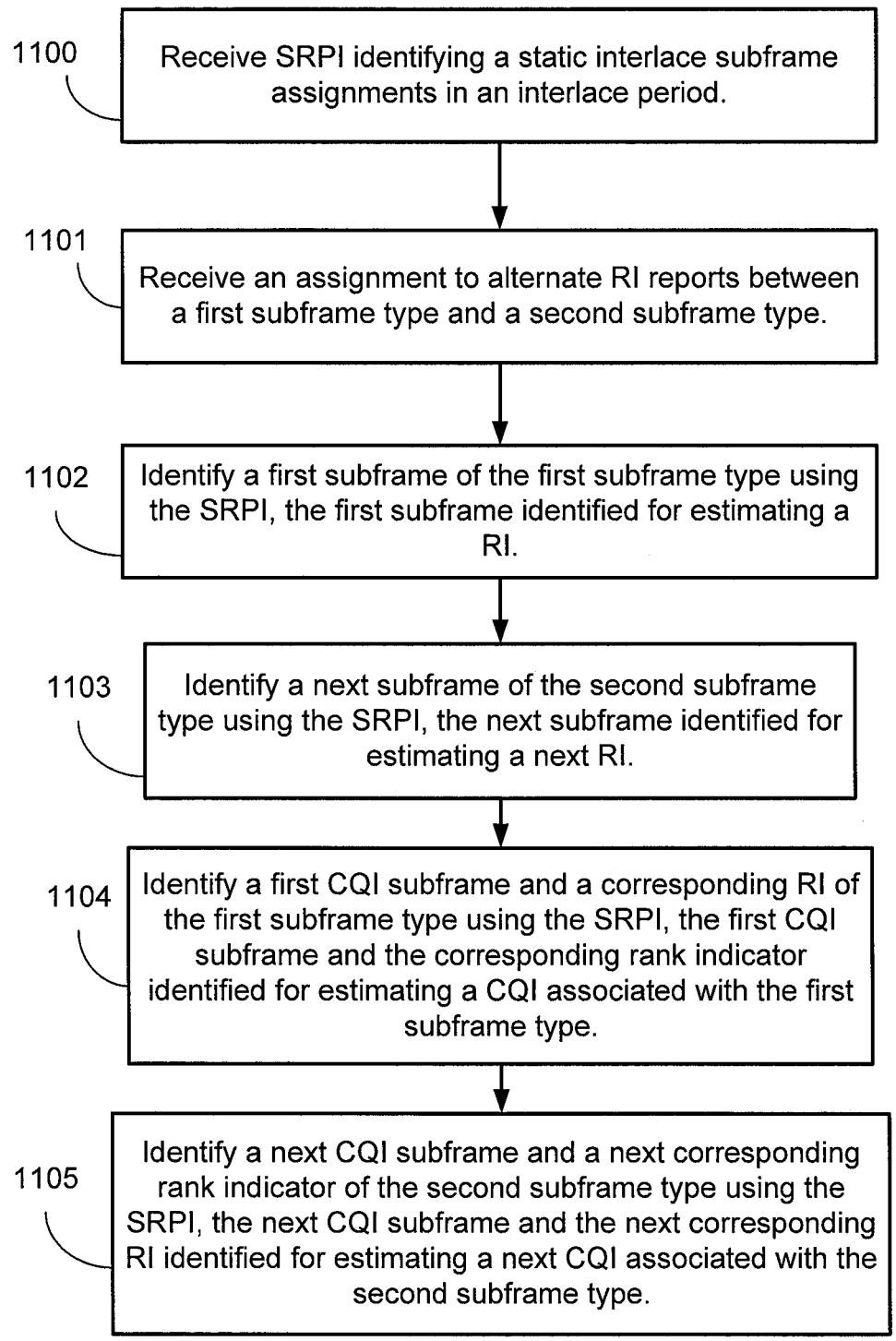
FIG. 11 is a functional block diagram conceptually illustrating example blocks executed to implement one aspect of the present disclosure.

FIG. 11 is a functional block diagram illustrating example blocks executed to implement one aspect of the present disclosure. In block 1100, SRPI are received identifying a static interlace subframe assignments in an interlace period. An assignment is received, in block 1101, to alternate RI reports between a first reference subframe type and a second reference subframe type. A first reference subframe of the first reference subframe type is identified, in block 1102, using the SRPI, the first reference subframe identified for estimating a RI. A next subframe of the second reference subframe type is identified, in block 1103, using the SRPI, the next subframe identified for estimating a next RI. A first CQI subframe and a corresponding RI of the first reference subframe type are identified, in block 1104, using the SRPI, the first CQI subframe and the corresponding rank indicator identified for estimating a CQI associated with the first reference subframe type. A next CQI subframe and a next corresponding rank indicator of the second reference subframe type are identified, in block 1105, using the SRPI, the next CQI subframe and the next corresponding RI identified for estimating a next CQI associated with the second reference subframe type.

In another aspect of the present disclosure, multiple independent periodic estimation and reporting engines are defined. These multiple independent estimation and reporting engines may be provided as information elements (IEs) in the standard configuration utilities. For legacy UEs, such as UEs configured according to Rel-8, the second estimation and reporting engine will be ignored. The multiple estimation and reporting engines will be assigned the same parameters, but the values of those parameters may be different. For example, they may have different periodicities, different offsets, and the like. The estimation and reporting engines are also defined to be independent and parallel. Thus, the UEs will utilize both engines at the same time. The reporting procedures will generally occur as defined in at least Rel-8, except for the multiple engines running simultaneously. Moreover, the CQI estimations are made conditioned on the latest reported rank indicator as estimated and reported by the same engine.

In operation, an eNB may setup the estimation and reporting engines so that the reported rank indicator on one engine refers to clean interlaces while the reported rank indicator on another engine refers to unclean interlaces. Because the eNB may setup each estimation and reporting engine with specific periodicities and offsets, the UEs do not need to know the location of clean and unclean subframes, for example, through SRPI information, blind decoding, or the like. The rank indicator periodicity should be assigned as a multiple of 8 ms and may, in fact, be quite large (e.g., 40 ms, 80 ms, etc.). Also, depending on the periodicity assigned for CQI reporting, the CQIs may alternate between clean and unclean, which means that some CQI may be inconsistent, since, in this described example, one engine may be set for clean subframes only and another may be set for unclean subframes. In order to avoid this potential reporting of inconsistent CQIs, the reporting periodicity for CQIs may be set to 8 ms or some multiple of 8 ms.

Figure 12:
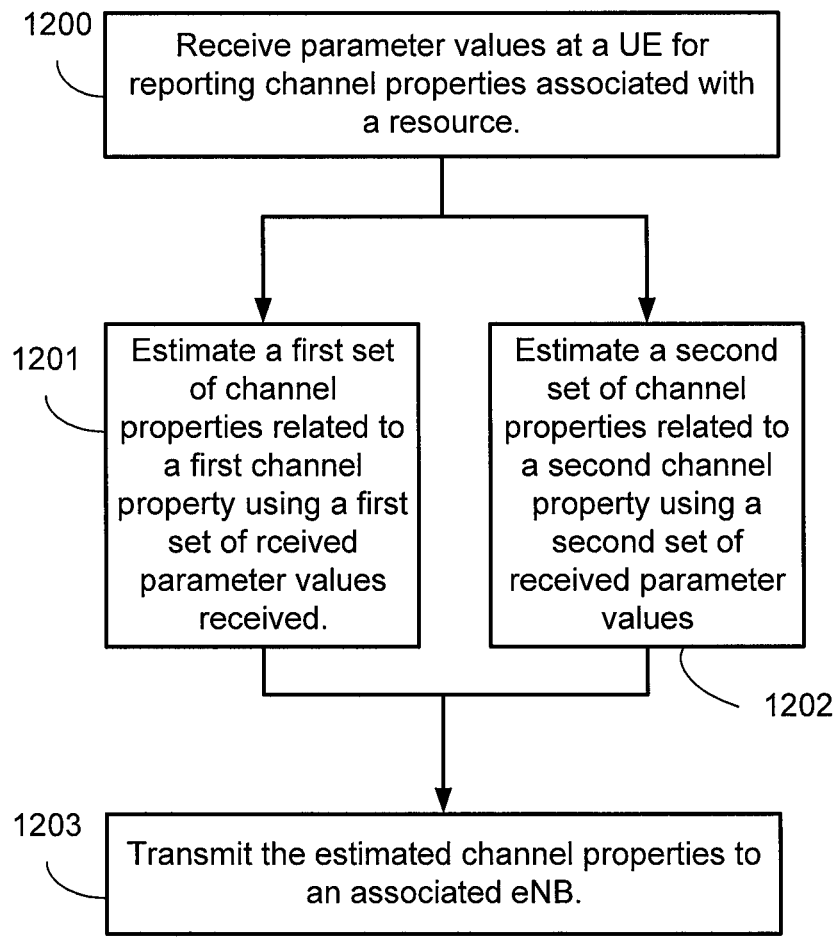
FIG. 12 is a functional block diagram conceptually illustrating example blocks executed to implement one aspect of the present disclosure.

FIG. 12 is a functional block diagram illustrating example blocks executed to implement one aspect of the present disclosure. In block 1200, parameter values are received at a UE for reporting channel properties associated with a resource. A first set of channel properties related to a first channel property is estimated, in block 1201, where the estimate uses a first set of the parameter values received. A second set of channel properties related to a second channel property is estimated, in block 1202, where the estimate uses a second set of the parameter values received, wherein the estimating of the first and second sets of channel properties is performed in parallel. The estimated channel properties are transmitted, in block 1203, to an associated eNB.

FIG. 13 is a block diagram conceptually illustrating a UE 120 configured according to one aspect of the present disclosure. UE 120 includes controller/processor 580 that operates, executes, and manages the functional aspects of the UE 120. UE 120 includes antennas 1306 which provide a means for receiving multiple parameter values 1302-1304 associated with channel property reporting modules 1300. The channel property reporting modules 1300 provide multiple periodic reporting engines that each schedule and report channel property measurements, such as rank indicator estimates, CQI, PMI, and the like. The parameter values 1302-1304 are multiple sets of parameters to set up the periodicities, offsets, and the like, for each individual module of channel property reporting modules 1300. The controller/processor 580 executes the channel property reporting modules 1300 in parallel using the parameter values 1302-1304 as inputs for configuring each module, thereby providing means for running the channel property reporting modules 1300 in parallel using the parameter values 1302-1304. Based on the individual configurations, UE 120 performs channel property measurements and estimates through execution of measurement and estimate modules 1301. When the channel properties resulting from the channel property reporting modules 1300 are measured or estimated, the channel properties are transmitted through execution of channel property report transmitter 1305 and antennas 1306. The executing channel property report transmitter 1305 along with the antennas 1306 provide means for transmitting the estimated channel properties to an eNB.

FIG. 14 is a block diagram conceptually illustrating an eNB 110 configured according to one aspect of the present disclosure. eNB 110 includes controller/processor 540 that operates, executes, and manages the functional aspects of eNB 110. When scheduling for each UE being served by eNB 110, controller/processor 540 executes a channel property reporting scheduler 1400. The executing channel property reporting scheduler 1400 determines scheduling parameters for the multiple periodic reporting engines, such as channel property reporting modules 1300 (FIG. 13), to measure, estimate, and report channel properties. The channel property reporting scheduler 1400 determines which reporting engines should measure and estimate on particular subframes in the transmission stream. Therefore, channel property reporting scheduler 1400 provides means for compiling multiple sets of scheduling parameter values, parameter values 1302-1304, for multiple UE reporting engines to use in measuring, estimating, and reporting such channel properties to eNB 110. eNB 110 also includes antennas 1401. Once the parameter values 1302-1304 have been compiled by channel property reporting scheduler 1400, antennas 1401 provide the means for transmitting such parameter values 1302-1304 to the associated UE.

Figure 15:
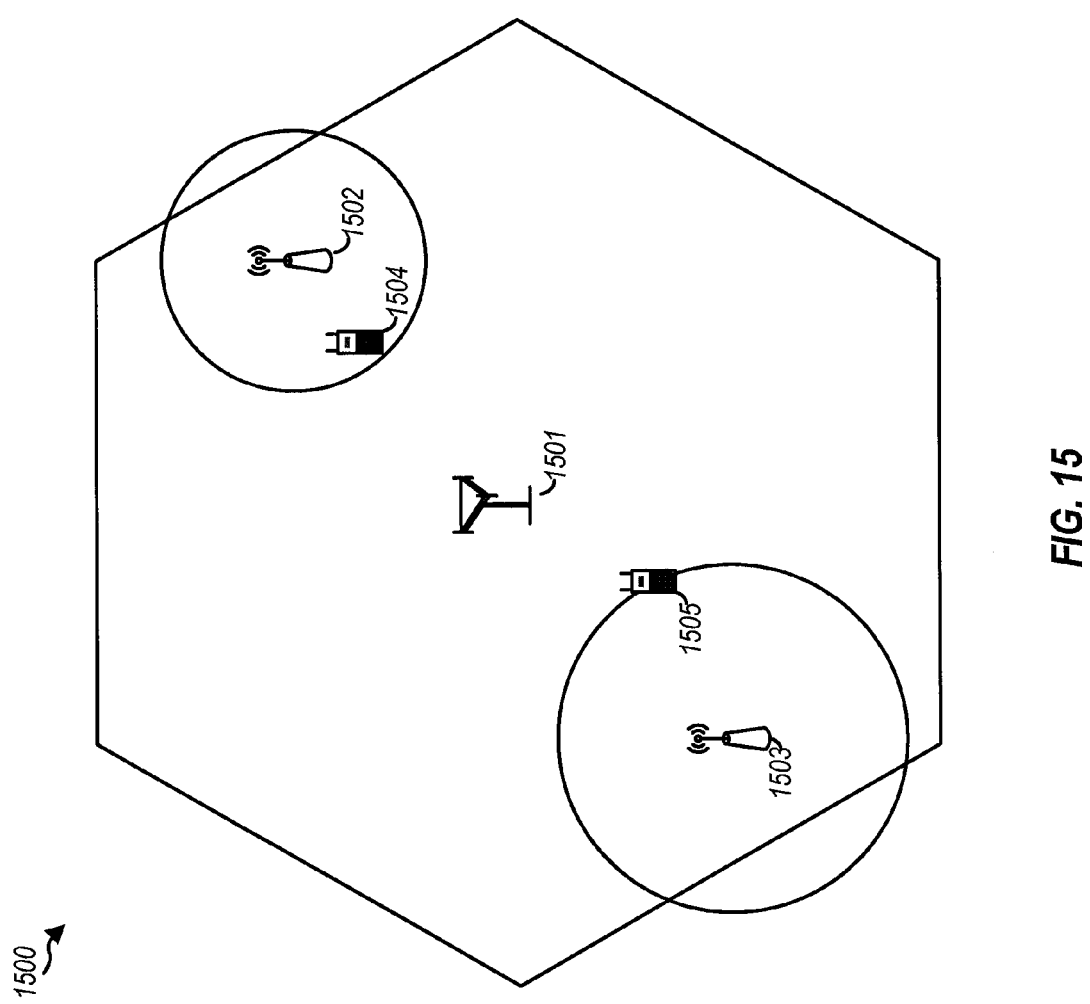
FIG. 15 is a block diagram conceptually illustrating a wireless communication network configured according to one aspect of the present disclosure.

FIG. 15 is a block diagram conceptually illustrating a wireless communication network 1500 configured according to one aspect of the present disclosure. Wireless communication network 1-500 is illustrated as a heterogeneous network, having a macro base station 1501, and two femto base stations 1502 and 1503. UEs 1504 and 1504 both operate within the cell range of macro base station 1501. UE 1504 is an advanced UE having advanced capabilities, while UE 1505 is a legacy UE with older features and capabilities. Macro base station 1501 generates multiple sets of parameter values intended to drive multiple periodic reporting engines within each UE it serves. Macro base station 1501 will transmit these multiple sets of parameter values to the associated UEs. Thus, multiple sets of parameter values are transmitted to UE 1504 to schedule multiple estimates and reports for the multiple reporting engines within UE 1504. Multiple sets of parameter values are also transmitted to UE 1505 which are intended also as input to multiple reporting engines in UE 1505. However, as a legacy UE, UE 1505 does not have multiple sets of reporting engines. As such, UE 1505 simply ignores the parameter values that are sent for the additional reporting engines and uses only one set of parameter values for its single reporting engine.

In operation, UE 1504 makes multiple measurements and estimates of channel properties, such as rank indicator, CQI, PMI, and the like. The parameter values transmitted from macro base station 1501 provide the periodicities and offsets that cause one of the reporting engines to measure and estimate for clean interlaces and another reporting engine to measure and estimate for unclean interlaces. However, UE 1504 simply executes its reporting engines and operates without the need to know which interlaces are clean or unclean. This property is set completely by the network through macro base station 1501.

In some embodiments, the parameter values may result in instances in which multiple reporting engines are scheduled to report at the same time. In such instances, only a single channel property is reported during that subframe. The macro base station 1501 or the UE 1504 may determine which channel property from which reporting engine to send. In one aspect, the UE 1504 may be configured to always send the channel property estimated from a particular reporting engine. In other embodiments, it may be configured to always transmit the channel property of the clean interlace. The various aspects of the disclosure are not limited to any single means for resolving such collisions.

In another aspect of the present disclosure, all of the rank indicators are configured to refer to clean subframes. This may be achieved by assigning a reporting periodicity that is a multiple of 8 ms along with a suitable offset that points to clean interlaces. The CQI periodicity is assigned so that all interlaces will be addressed (e.g., 5 ms). Because a rank indicator for an unclean subframe will be less than or equal to the rank indicator for a clean subframe, the eNB may make assumptions regarding the reported CQIs. For example, if the reported clean rank indicator is equal to 1, the unclean rank indicator will also be 1. Therefore, the eNB will be able to assume that all of such reported CQIs are consistent.

If, however, the clean rank indicator is greater than 1, the unclean rank indicator will be unknown and, therefore, the reported CQI may be inconsistent. For example, if the clean rank indicator is 2, the unclean rank indicator could be either 2 or 1. The eNB would, therefore, not know what the unclean rank indicator is. The eNB may handle the CQI's conditioned from unknown rank indicators in multiple ways. For example, the eNB may always assume that an unclean rank indicator always equals the clean rank indicator. In this example, all of the reported CQIs will become consistent by assumption. Performance may improve here if the eNB uses multiple CQI backoff loops depending on the subframe types. In another example, the eNB may assume that unclean rank indicators always equal 1. In this scenario, the eNB may apply a bias to the reported inconsistent/unclean CQIs or apply multiple CQI backoff loops. In a further example, the eNB may periodically request an aperiodic CQI feedback on unclean subframes. In this scenario, the eNB would obtain actual rank indicator information for unclean subframes that may be used for additional assumptions.

Figure 16:
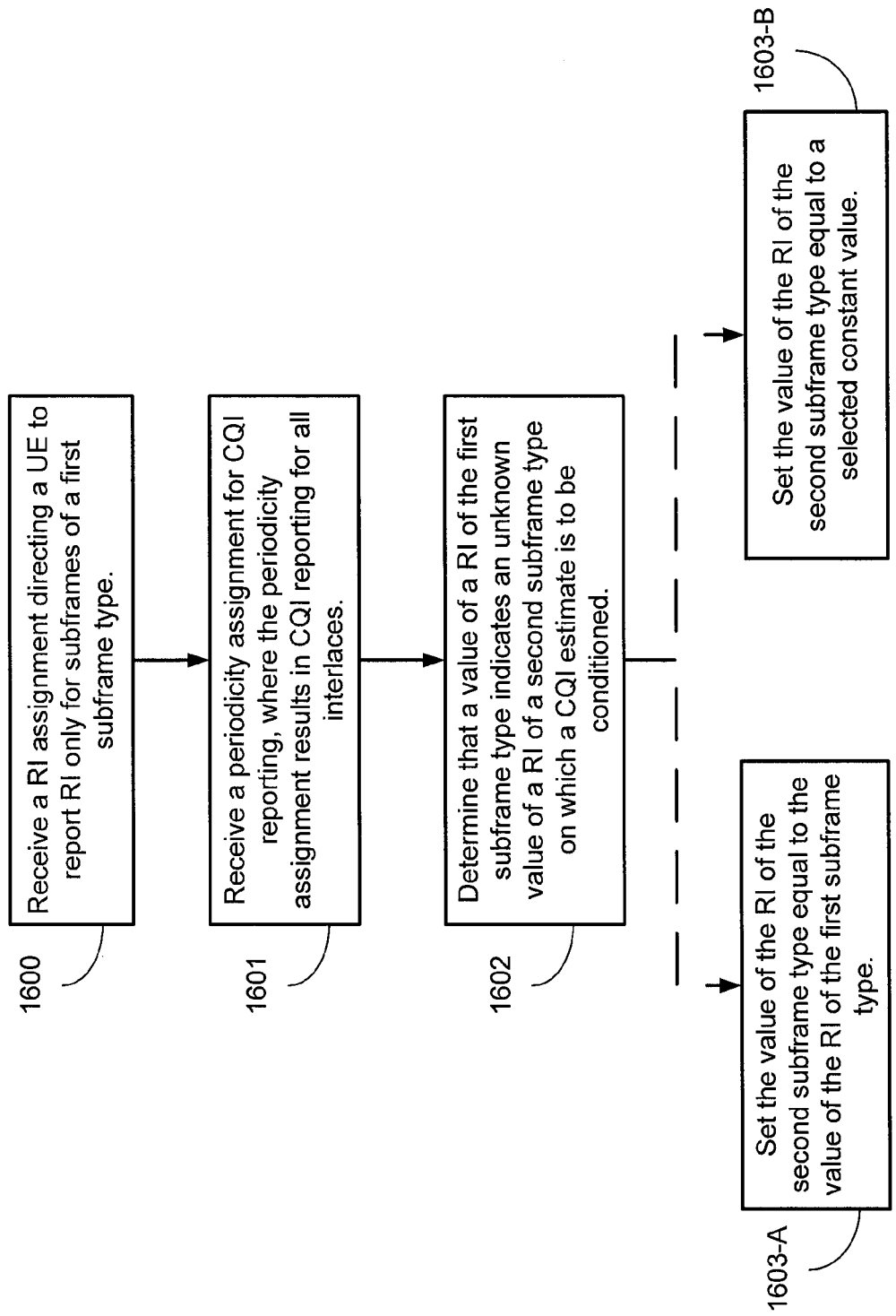
FIG. 16 is a functional block diagram conceptually illustrating example blocks executed to implement one aspect of the present disclosure.

FIG. 16 is a functional block diagram illustrating example blocks executed to implement one aspect of the present disclosure. In block 1600, a RI assignment is received directing a UE to report rank indicators only for subframes of a first reference subframe type. A periodicity assignment for CQI reporting is received, in block 1601, where the periodicity assignment results in CQI reporting for all interlaces. In block 1602, it is determined that a value of a rank indicator of the first reference subframe type indicates an unknown value of a rank indicator of a second reference subframe type on which a CQI estimate is to be conditioned. In a first optional block 1603-A, the value of the rank indicator of the second reference subframe type is set equal to the value of the RI of the first reference subframe type. In a second optional block 1603-B, the value of the rank indicator of the second reference subframe type is set equal to a selected constant value.

In an additional aspect of the present disclosure, the UEs are capable of CRS-IC. This aspect applies in a scenario where there is a CRS-CRS collision in the serving cell. The described type of UE may know with which other cell(s) its own cell is coordinating. This could be either the strongest interfering cell that that UE can detect or it may be the eNB may inform the UE, whether through RRC signaling or otherwise, about cells of for which coordination is ongoing, including the subframe partitioning. Because this information would not change often, signaling between the eNB and UE would not be an issue. For purposes of this aspect of the present disclosure, the interfering cell has the same CRS offset as the serving cell. Moreover, the UE may determine whether to obtain clean or unclean CQIs or rank indicators by adding back any interference that may be cancelled by the UE.

In the presently-described aspect, both the rank indicator and CQI reports alternate between clean and unclean subframes regardless of the subframe used for the estimation. Because the UE is capable of cancelling the CRS interference of any interfering cell that is strong enough for the UE to detect its main broadcast signals (e.g., PSS/SSS), if the UE selects an unclean subframe to perform an estimation for a clean rank indicator or CQI, it may simply cancel the CRS interference in the unclean subframe and use the new "cleaned" version. As such, because there is an assumption of CRS collisions in the presently described aspect, it essentially does not matter if a particular subframe is clean or unclean. The UE will perform CRS-IC equally on both clean and unclean CQI or rank indicator. Additionally, if the UE is to perform an unclean estimation, it may re-add the cancelled CRS interference to estimate the unclean CQI or rank indicator. Moreover, there is no need for specific periodicities. Because the actual periodicity is practically doubled, due to the alternating reports, small periodicity values should be considered by the eNB. The presently-described aspect would also not require any changes to CQI-related RRC signaling. The eNB and UE would agree on which reports are clean and which are unclean.

It should be noted than in selected additional aspects, where more involved reporting methods are desired, such as requiring more clean reports than unclean reports or the like, some additional signaling may be defined to specify the particular pattern of reporting to be conducted.

It should further be noted that in situations of the presently-described aspect where the UE is under the coverage of two strong interferers cooperating within its own cell, the UE may walk through each of the four options (i.e., both subframes clean, the first clean and the second unclean, the first unclean and the second clean, and both unclean). Additional signaling may be defined to make it easier to determine which combinations to perform.

Figure 17:
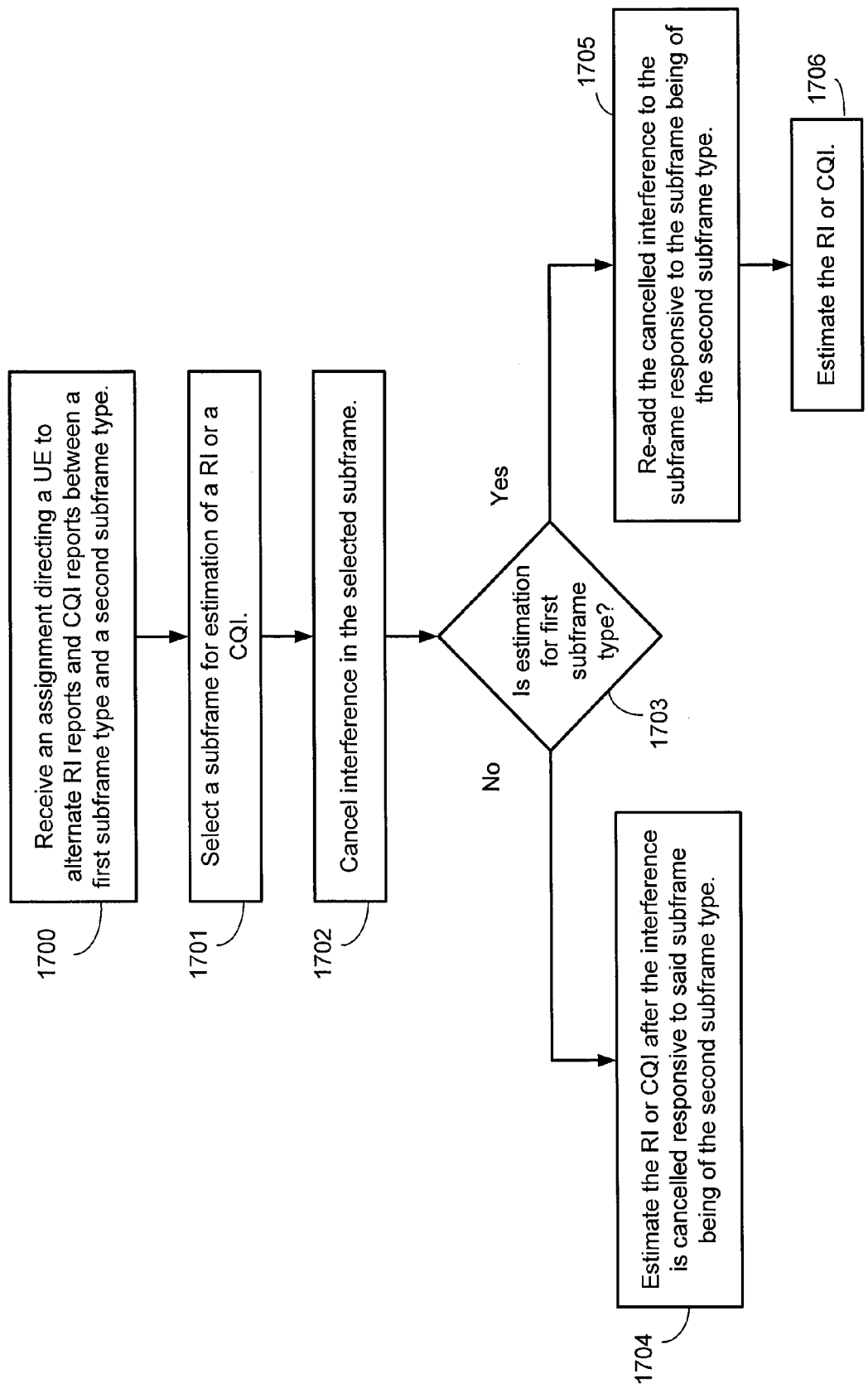
FIG. 17 is a functional block diagram conceptually illustrating example blocks executed to implement on aspect of the present disclosure.

FIG. 17 is a functional block diagram illustrating example blocks executed to implement on aspect of the present disclosure. In block 1700, an assignment is received directing a UE to alternate RI reports and CQI reports between a first reference subframe type and a second reference subframe type. A subframe is selected, in block 1701, for estimation of a RI or a CQI. Interference is cancelled in the selected subframe in block 1702. A determination is made, in block 1703, whether the estimation is for a first reference subframe type. If not, then, in block 1704, the RI or CQI is estimated after the interference is cancelled responsive to the subframe being of the second reference subframe type. If the estimation is directed to a first reference subframe type, then, in block 1705, the cancelled interference is re-added to the subframe responsive to the subframe being of the second reference subframe type. Thereafter, in block 1706, the RI or CQI is estimated.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8, 10-12, and 15-17 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving a plurality of parameter values at a user equipment (UE) for reporting a plurality of channel properties associated with a resource, wherein the plurality of parameter values includes a first set of parameter values that includes a first periodicity and a first offset, and a second set of parameter values that includes a second periodicity and a second offset;
estimating a first set of channel properties of the plurality of channel properties related to a first channel property, the estimating the first set of channel properties using the first set of parameter values of the plurality of parameter values to estimate at least a first rank indicator according to the first periodicity, wherein the first set of parameter values configures the estimating of the first set of channel properties for clean interlaces;
estimating a second set of channel properties of the plurality of channel properties related to a second channel property, the estimating the second set of channel properties using the second set of parameter values of the plurality of parameter values to estimate at least a second rank indicator according to the second periodicity, wherein the second set of parameter values configures the estimating of the second set of channel properties for unclean interlaces; and
transmitting the plurality of channel properties to an associated evolved node B (eNB).

2. The method of claim 1, wherein the first set of parameter values that configure the estimating of the first set of channel properties for clean interlaces includes a reporting periodicity that is a multiple of an interlace period.

3. The method of claim 1, further comprising:
detecting a transmission collision of the first and second sets of channel properties scheduled for the transmitting in a same subframe; and
determining one of the first and second sets of channel properties to transmit during the same subframe.

4. The method of claim 3, wherein the determining comprises one of:
selecting the first set of channel properties;
selecting the one of the first and second sets of channel properties estimated from a clean subframe;
selecting the one of the first and second sets of estimated channel properties according to a configuration of the UE; and
selecting the one of the first and second sets of estimated channel properties according to collision parameters received from the associated eNB.

5. The method of claim 1, wherein the first and second sets of estimated channel properties comprise one or more of:
a channel quality indicator (CQI); and
a precoding matrix indicator (PMI).

6. An apparatus configured for wireless communication, comprising:
means for receiving a plurality of parameter values at a user equipment (UE) for reporting a plurality of channel properties associated with a resource, wherein the plurality of parameter values includes a first set of parameter values that includes a first periodicity and a first offset, and a second set of parameter values that includes a second periodicity and a second offset;

means for estimating a first set of channel properties of the plurality of channel properties related to a first channel property, the means for estimating the first set of channel properties using the first set of parameter values of the plurality of parameter values to estimate at least a first rank indicator according to the first periodicity, wherein the first set of parameter values configures the estimating of the first set of channel properties for clean interlaces;

means for estimating a second set of channel properties of the plurality of channel properties related to a second channel property, the means for estimating the second set of channel properties using the second set of parameter values of the plurality of parameter values to estimate at least a second rank indicator according to the second periodicity, wherein the second set of parameter values configures the estimating of the second set of channel properties for unclean interlaces; and means for transmitting the plurality of channel properties to an associated evolved node B (eNB).

7. The apparatus of claim 6, wherein the first set of parameter values that configure the estimating of the first set of channel properties for clean interlaces includes a reporting periodicity that is a multiple of an interlace period.

8. The apparatus of claim 6, further comprising:
means for detecting a transmission collision of the first and second sets of channel properties scheduled for the means for transmitting in a same subframe; and
means for determining one of the first and second sets of channel properties to transmit during the same subframe.

9. The apparatus of claim 8, wherein the means for determining comprises one of:
means for selecting the first set of channel properties;
means for selecting the one of the first and second sets of channel properties estimated from a clean subframe;
means for selecting the one of the first and second sets of estimated channel properties according to a configuration of the UE; and
means for selecting the one of the first and second sets of estimated channel properties according to collision parameters received from the associated eNB.

10. The apparatus of claim 6, wherein the first and second sets of estimated channel properties comprise one or more of:
a channel quality indicator (CQI); and
a precoding matrix indicator (PMI).

11. A non-transitory computer-readable medium having program code recorded thereon, the program code comprising:
program code to receive a plurality of parameter values at a user equipment (UE) for reporting a plurality of channel properties associated with a resource, wherein the plurality of parameter values includes a first set of parameter values that includes a first periodicity and a first offset, and a second set of parameter values that includes a second periodicity and a second offset;
program code to estimate a first set of channel properties of the plurality of channel properties related to a first channel property, the program code to estimate the first set of channel properties using the first set of parameter values of the plurality of parameter values to estimate at least a first rank indicator according to the first periodicity, wherein the first set of parameter values configures the program code to estimate the first set of channel properties for clean interlaces;

program code to estimate a second set of channel properties of the plurality of channel properties related to a second channel property, the program code to estimate the second set of channel properties using the second set of parameter values of the plurality of parameter values to estimate at least a second rank indicator according to the second periodicity, wherein the second set of parameter values configures the program code to estimate the second set of channel properties for unclean interlaces; and program code to transmit the plurality of channel properties to an associated evolved node B (eNB).

12. The non-transitory computer-readable medium of claim 11, wherein the first set of parameter values that configures the program code to estimate the first set of channel properties for clean interlaces includes a reporting periodicity that is a multiple of an interlace period.

13. The non-transitory computer-readable medium of claim 11, further comprising:
program code to detect a transmission collision of the first and second sets of channel properties scheduled for use in the program code to transmit in a same subframe; and
program code to determine one of the first and second sets of channel properties to transmit during the same subframe.

14. The non-transitory computer-readable medium of claim 13, wherein the program code to determine comprises one of:
program code to select the first set of channel properties;
program code to select the one of the first and second sets of channel properties estimated from a clean subframe;
program code to select the one of the first and second sets of estimated channel properties according to a configuration of the UE; and
program code to select the one of the first and second sets of estimated channel properties according to collision parameters received from the associated eNB.

15. The non-transitory computer-readable medium of claim 11, wherein the first and second sets of estimated channel properties comprise one or more of:
a channel quality indicator (CQI); and
a precoding matrix indicator (PMI).

16. An apparatus configured for wireless communication, comprising
at least one processor; and
a memory coupled to the at least one processor, wherein the at least one processor is configured:
to receive a plurality of parameter values at a user equipment (UE) for reporting a plurality of channel properties associated with a resource, wherein the plurality of parameter values includes a first set of parameter values that includes a first periodicity and a first offset, and a second set of parameter values that includes a second periodicity and a second offset;
to estimate a first set of channel properties of the plurality of channel properties related to a first channel property, the at least one processor configured to estimate the first set of channel properties using the first set of parameter values of the plurality of parameter values to estimate at least a first rank indicator according to the first periodicity, wherein the first set of parameter values configures the at least one processor to estimate the first set of channel properties for clean interlaces;

to estimate a second set of channel properties of the plurality of channel properties related to a second channel property, the at least one processor configured estimate the second set of channel properties using the second set of parameter values of the plurality of parameter values to estimate at least a second rank indicator according to the second periodicity, wherein the second set of parameter values configures the at least one processor to estimate the second set of channel properties for unclean interlaces; and to transmit the plurality of channel properties to an associated evolved node B (eNB).

17. The apparatus of claim 16, wherein the first set of parameter values that configures the at least one processor to estimate the first set of channel properties for clean interlaces includes a reporting periodicity that is a multiple of an interlace period.

18. The apparatus of claim 16, wherein the at least one processor is further configured:

to detect a transmission collision of the first and second sets of channel properties scheduled for the transmission in a same subframe; and to determine one of the first and second sets of channel properties to transmit during the same subframe.

19. The apparatus of claim 18, wherein the configuration of the at least one processor to determine comprises configuration of the at least one processor to one of:

select the first set of channel properties;

select the one of the first and second sets of channel properties estimated from a clean subframe;

select the one of the first and second sets of estimated channel properties according to a configuration of the UE; and select the one of the first and second sets of estimated channel properties according to collision parameters received from the associated eNB.

20. The apparatus of claim 16, wherein the first and second sets of estimated channel properties comprise one or more of:

a channel quality indicator (CQI); and a precoding matrix indicator (PMI).

* * * * *